(12) United States Patent
Hofmann et al.

(10) Patent No.: US 8,586,491 B2
(45) Date of Patent: *Nov. 19, 2013

(54) COMPOSITION FOR HIGH PERFORMANCE GLASS, HIGH PERFORMANCE GLASS FIBERS AND ARTICLES THEREFROM

(75) Inventors: Douglas A. Hofmann, Hebron, OH (US); Peter B. McGinnis, Gahanna, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 1746 days.

This patent is subject to a terminal disclaimer.

(21) Appl. No.: 11/699,719

(22) Filed: Jan. 30, 2007

(65) Prior Publication Data

US 2013/0217822 A1    Aug. 22, 2013

Related U.S. Application Data

(63) Continuation-in-part of application No. 11/267,739, filed on Nov. 4, 2005, now Pat. No. 7,799,713.

(51) Int. Cl.
*C03C 13/00* (2006.01)
*C03B 37/01* (2006.01)

(52) U.S. Cl.
USPC .......... 501/35; 501/36; 501/69; 501/70; 65/454

(58) Field of Classification Search
USPC .......... 501/35, 36, 69, 70; 65/454–470
See application file for complete search history.

(56) References Cited

U.S. PATENT DOCUMENTS

| | | | |
|---|---|---|---|
| 3,044,888 A | 7/1962 | Provance |
| 3,189,471 A | 6/1965 | Thomas |
| 3,220,915 A | 11/1965 | Shannon |
| 3,360,386 A | 12/1967 | Kelley et al. |
| 3,402,055 A | 9/1968 | Harris et al. |
| 3,408,213 A | 10/1968 | Provance et al. |
| 3,484,259 A | 12/1969 | Lewis et al. |
| 3,498,805 A | 3/1970 | STalego |
| 3,524,738 A | 8/1970 | Grubb et al. |
| 3,535,096 A | 10/1970 | Bour et al. |
| 3,709,705 A | 1/1973 | Hagedorn |
| 3,804,646 A | 4/1974 | Dumbaugh, Jr. |
| 3,833,388 A | 9/1974 | Ohlberg |
| 3,861,926 A | 1/1975 | Irlam et al. |
| 3,876,481 A | 4/1975 | Erickson et al. |
| 3,887,386 A | 6/1975 | Majumdar |
| 3,892,581 A | 7/1975 | Burgman et al. |
| 3,902,881 A | 9/1975 | Pirooz |
| 3,904,423 A | 9/1975 | Guthrie |
| 3,945,838 A | 3/1976 | Erickson et al. |
| 4,002,482 A | 1/1977 | Coenen |
| 4,012,131 A | 3/1977 | Krohn |
| 4,046,948 A | 9/1977 | Zlochower |
| 4,063,001 A | 12/1977 | Zlochower |
| 4,090,882 A | 5/1978 | Rauschenfels |
| 4,199,364 A | 4/1980 | Neely |
| 4,325,724 A | 4/1982 | Froberg |
| 4,366,251 A | 12/1982 | Rapp |
| 4,375,527 A | 3/1983 | Zahner |
| 4,386,164 A | 5/1983 | Moser |
| 4,491,951 A | 1/1985 | Dunn |
| 4,569,471 A | 2/1986 | Ingemansson |
| 4,582,748 A | 4/1986 | Eastes |
| 4,764,487 A | 8/1988 | Lewis |
| 4,824,806 A | 4/1989 | Yokoi et al. |
| 4,857,485 A | 8/1989 | Brennan et al. |
| 4,882,302 A | 11/1989 | Horiuchi et al. |
| 4,892,846 A | 1/1990 | Rogers et al. |
| 4,935,291 A | 6/1990 | Gunnink |
| 4,976,587 A | 12/1990 | Johnston et al. |
| 5,212,121 A | 5/1993 | Omata |
| 5,248,637 A | 9/1993 | Taneda et al. |
| 5,302,444 A | 4/1994 | Jackson et al. |
| 5,332,699 A | 7/1994 | Olds et al. |

(Continued)

FOREIGN PATENT DOCUMENTS

CA    2528923    12/2004
CN    1113893    12/1995

(Continued)

OTHER PUBLICATIONS

Machine Translation of JP 2002-154843, May 28, 2002.*
PCT Notification of Transmittal of the International Search Report and the Written Opinion of the International Searching Authority, or the Declaration, Application PCT/US06/42437 dated Apr. 30, 2007.
PCT Notification of Transmittal of the International Search Report and the Written Opinion of the International Searching Authority, or the Declaration, Application PCT/US06/42406 dated May 8, 2007.
European Search Report 06 82 7125 dated Dec. 10, 2008.
Thomson Scientific, London, GB; AN 1983 50368K Database WPI Week 198321.
Conference paper by G. Fredell, "Fiber metal laminates for improved structural integrity," 1992.
Article by P. Joosee, Literature search of mechanical properties of fiber-reinforced plastics for wind turbine rotors, Dec. 1988.

(Continued)

*Primary Examiner* — Karl Group
*Assistant Examiner* — Elizabeth A Bolden
(74) *Attorney, Agent, or Firm* — Calfee, Halter & Griswold LLP

(57) ABSTRACT

Glass batch compositions for the formation of high-modulus, and high-strength glass fibers as well as fibers suitable for use as textile and reinforcements are disclosed. Fibers formed of the composition are especially suitable for use in high-strength, low-weight applications such as windmill blades and high strength and modulus applications where strength and stiffness are required in the composite. The glass composition is up to about 70.5 weight % $SiO_2$, about 24.5 weight % $Al_2O_3$, about 22 weight % alkaline earth oxides and may include small amounts of alkali metal oxides and $ZrO_2$. Additionally, glass fibers formed from the inventive composition are non-corrosive or substantially non-corrosive in nature. Due to the non-corrosive nature of the glass fibers, glass fibers made with the inventive composition may be used in applications where the glass fibers or a composite formed from the glass fibers are in contact with a corrosive substance.

20 Claims, 4 Drawing Sheets

(56) References Cited

U.S. PATENT DOCUMENTS

| | | |
|---|---|---|
| 5,474,425 A | 12/1995 | Lawlor |
| 5,569,629 A | 10/1996 | TenEyck et al. |
| 5,576,252 A | 11/1996 | Rapp et al. |
| 5,585,312 A | 12/1996 | TenEyck et al. |
| 5,691,255 A | 11/1997 | Jensen et al. |
| 5,719,092 A | 2/1998 | Arrington |
| 5,789,329 A | 8/1998 | Eastes et al. |
| 5,819,614 A | 10/1998 | Jander |
| 5,843,853 A | 12/1998 | Heitmann |
| 5,851,932 A | 12/1998 | Dickson et al. |
| 5,935,886 A | 8/1999 | Jensen et al. |
| 5,948,535 A | 9/1999 | Chiurlo et al. |
| 5,962,354 A | 10/1999 | Fyles et al. |
| 5,997,977 A | 12/1999 | Zou et al. |
| 6,063,470 A | 5/2000 | Zou et al. |
| 6,069,100 A | 5/2000 | Naumann et al. |
| 6,089,021 A | 7/2000 | Senanayake |
| 6,101,847 A | 8/2000 | Shamp |
| 6,136,735 A | 10/2000 | Gallo et al. |
| 6,156,683 A | 12/2000 | Grove-Rasmussen et al. |
| 6,169,047 B1 | 1/2001 | Nishizawa et al. |
| 6,214,429 B1 | 4/2001 | Zou et al. |
| 6,237,369 B1 | 5/2001 | LeBlanc et al. |
| 6,248,678 B1 | 6/2001 | Pinckney |
| 6,300,264 B1 | 10/2001 | Ohara |
| 6,306,786 B1 | 10/2001 | Koyama et al. |
| 6,314,760 B1 | 11/2001 | Chenoweth |
| 6,329,310 B1 | 12/2001 | Peuchert et al. |
| 6,358,873 B1 | 3/2002 | Stewart |
| 6,376,403 B1 | 4/2002 | Koyama et al. |
| 6,399,527 B1 | 6/2002 | Kishimoto et al. |
| 6,403,676 B1 | 6/2002 | Jia et al. |
| 6,422,041 B1 | 7/2002 | Simpson et al. |
| 6,451,720 B1 | 9/2002 | Kishimoto |
| 6,457,943 B1 | 10/2002 | Olsen et al. |
| 6,458,436 B1 | 10/2002 | Hansen et al. |
| 6,496,706 B1 | 12/2002 | Jou et al. |
| 6,540,508 B1 | 4/2003 | Simpson et al. |
| 6,579,599 B1 | 6/2003 | Blum et al. |
| 6,686,304 B1 | 2/2004 | Wallenberger |
| 6,794,322 B2 | 9/2004 | Sircar |
| 6,809,050 B1 | 10/2004 | McGinnis et al. |
| 6,818,575 B2 | 11/2004 | Wallenberger |
| 6,867,158 B2 | 3/2005 | Peuchert |
| 6,933,045 B2 | 8/2005 | Tamura |
| 6,933,252 B2 | 8/2005 | Pierce |
| 6,998,361 B2 | 2/2006 | Lewis |
| 7,022,634 B2 | 4/2006 | Hamilton et al. |
| 7,189,671 B1 | 3/2007 | Lewis |
| 7,259,118 B2 | 8/2007 | Jubb et al. |
| 7,285,510 B2 | 10/2007 | Sakaguchi et al. |
| 7,449,419 B2 | 11/2008 | Li |
| 7,509,819 B2 | 3/2009 | Baker et al. |
| 7,781,355 B2 | 8/2010 | Berthereau et al. |
| 7,799,713 B2 * | 9/2010 | Hofmann et al. ............... 501/36 |
| 7,811,954 B2 | 10/2010 | Berthereau et al. |
| 7,823,417 B2 | 11/2010 | Hofmann et al. |
| 2001/0011058 A1 | 8/2001 | Tamura |
| 2002/0000101 A1 | 1/2002 | Chenoweth |
| 2002/0045528 A1 | 4/2002 | Kusuno et al. |
| 2003/0018855 A1 | 1/2003 | McWilliams et al. |
| 2003/0077178 A1 | 4/2003 | Stearns |
| 2003/0100431 A1 | 5/2003 | Koyo et al. |
| 2003/0166446 A1 | 9/2003 | Lewis |
| 2003/0188554 A1 | 10/2003 | Baker et al. |
| 2003/0207748 A1 | 11/2003 | Wallenberger |
| 2003/0224922 A1 | 12/2003 | Wallenberger |
| 2004/0092379 A1 | 5/2004 | Lewis |
| 2004/0220038 A1 | 11/2004 | Wolff |
| 2005/0009683 A1 | 1/2005 | Hamilton et al. |
| 2005/0014624 A1 | 1/2005 | Jubb et al. |
| 2005/0031703 A1 | 2/2005 | Beier et al. |
| 2005/0084440 A1 | 4/2005 | Chacon et al. |
| 2005/0085369 A1 | 4/2005 | Jensen |
| 2005/0090377 A1 | 4/2005 | Shelestak et al. |
| 2005/0107238 A1 | 5/2005 | Li |
| 2005/0130825 A1 | 6/2005 | Kravchenko et al. |
| 2005/0232828 A1 | 10/2005 | Merry |
| 2005/0234216 A1 | 10/2005 | Klein et al. |
| 2006/0001005 A1 | 1/2006 | Kishimoto et al. |
| 2006/0003884 A1 | 1/2006 | Nishizawa et al. |
| 2006/0257240 A1 | 11/2006 | Naskali et al. |
| 2007/0087139 A1 | 4/2007 | Creux et al. |
| 2007/0105701 A1 | 5/2007 | Hoffmann et al. |
| 2007/0107220 A1 | 5/2007 | Bakhuis et al. |
| 2008/0009403 A1 | 1/2008 | Hofmann et al. |
| 2008/0053152 A1 | 3/2008 | Kurachi et al. |
| 2008/0141721 A1 | 6/2008 | Adams et al. |
| 2009/0286440 A1 | 11/2009 | Lecomte et al. |
| 2010/0069220 A1 | 3/2010 | McGinnis |
| 2010/0093511 A1 | 4/2010 | Berthereau et al. |
| 2010/0160139 A1 | 6/2010 | McGinnis |
| 2010/0160140 A1 | 6/2010 | McGinnis |
| 2010/0162772 A1 | 7/2010 | McGinnis |
| 2010/0184345 A1 | 7/2010 | Lalande et al. |
| 2011/0000263 A1 | 1/2011 | Hofmann |
| 2011/0003678 A1 | 1/2011 | Hofmann |
| 2011/0039681 A1 | 2/2011 | Lecomte et al. |

FOREIGN PATENT DOCUMENTS

| | | |
|---|---|---|
| CN | 1243501 | 2/2000 |
| CN | 1392870 | 1/2003 |
| CN | 1678654 | 10/2005 |
| CN | 101580344 | 11/2009 |
| CN | 1015979140 | 12/2009 |
| CN | 101691278 | 4/2010 |
| CN | 101838110 | 9/2010 |
| CN | 101549958 | 1/2011 |
| DE | 1496520 | 8/1969 |
| EP | 500325 | 8/1992 |
| EP | 931774 | 7/1999 |
| FR | 1357393 | 4/1964 |
| FR | 1435073 | 4/1966 |
| FR | 1534135 | 12/1968 |
| FR | 1589410 | 3/1970 |
| FR | 2223328 | 10/1974 |
| FR | 2692248 | 12/1993 |
| FR | 2856055 | 12/2004 |
| FR | 2879591 | 6/2006 |
| FR | 2916438 | 11/2008 |
| GB | 428 720 A | 5/1935 |
| GB | 1006524 | 10/1965 |
| GB | 1147718 | 4/1969 |
| GB | 1209244 | 10/1970 |
| GB | 1531287 | 11/1978 |
| JP | 45-011228 | 5/1970 |
| JP | 51-055308 | 5/1976 |
| JP | 58 064243 A | 4/1983 |
| JP | 58064243 A * | 4/1983 |
| JP | 58-088138 | 5/1983 |
| JP | 1-189985 | 7/1989 |
| JP | 1-239039 | 9/1989 |
| JP | 3-112650 | 5/1991 |
| JP | 4-050144 | 2/1992 |
| JP | 6-211543 | 8/1994 |
| JP | 6-219780 | 8/1994 |
| JP | 6-305773 | 11/1994 |
| JP | 7-010598 | 1/1995 |
| JP | 8-231240 | 9/1996 |
| JP | 2582361 | 2/1997 |
| JP | 11-021147 | 1/1999 |
| JP | 11-21147 | 1/1999 |
| JP | 2000-247677 | 9/2000 |
| JP | 2000-247683 | 9/2000 |
| JP | 2001-206733 | 7/2001 |
| JP | 2001-316961 | 11/2001 |
| JP | 2002-003237 | 1/2002 |
| JP | 2002-060252 | 2/2002 |
| JP | 2002-069941 | 3/2002 |
| JP | 2002-081022 | 3/2002 |
| JP | 2002-154843 | 5/2002 |
| JP | 2002-293574 | 10/2002 |
| JP | 2003-137590 | 5/2003 |

(56) References Cited

FOREIGN PATENT DOCUMENTS

| JP | 2003-160350 | 6/2003 |
|---|---|---|
| JP | 2003-171143 | 6/2003 |
| JP | 2003-183031 | 7/2003 |
| JP | 2003-239847 | 8/2003 |
| JP | 2003-321247 | 11/2003 |
| JP | 2004-091307 | 3/2004 |
| WO | 99/31021 | 6/1999 |
| WO | 00/15526 | 3/2000 |
| WO | 02/20419 | 3/2002 |
| WO | 02/42233 | 5/2002 |
| WO | 2004/020506 | 3/2004 |
| WO | WO 2004/094794 | 11/2004 |
| WO | 2005/092808 | 10/2005 |
| WO | 2005/093227 | 10/2005 |
| WO | 2006/064164 | 6/2006 |
| WO | WO 2007/055964 | 5/2007 |
| WO | WO 2007/055968 | 5/2007 |
| WO | 2008/073585 | 6/2008 |
| WO | 2010/075258 | 7/2010 |
| WO | 2010/075262 | 7/2010 |
| WO | 2010/075267 | 7/2010 |

OTHER PUBLICATIONS

U.S. Office Action, U.S. Appl. No. 11/267,739 dated Dec. 18, 2008.
U.S. Office Action, U.S. Appl. No. 11/267,739 dated Sep. 24, 2008.
PCT Notification Concerning Transmittal of International Preliminary Report on Patentability, Application PCT/US06/042406 dated May 15, 2008.
US Office Action, U.S. Appl. No. 11/267,702 dated Sep. 24, 2008.
US Office Action, U.S. Appl. No. 11/267,702 dated Dec. 23, 2008.
Office action from U.S. Appl. No. 09/703,234 dated Apr. 15, 2002.
Office action from U.S. Appl. No. 09/703,234 dated Sep. 6, 2002.
Advisory action from U.S. Appl. No. 09/703,234 dated Nov. 19, 2002.
Office action from U.S. Appl. No. 09/703,234 dated Feb. 4, 2003.
Office action from U.S. Appl. No. 09/703,234 dated Jul. 11, 2003.
Advisory action from U.S. Appl. No. 09/703,234 dated Oct. 24, 2003.
Office action from U.S. Appl. No. 09/703,234 dated Dec. 16, 2003.
Notice of Allowance from U.S. Appl. No. 09/703,234 dated Jul. 6, 2004.
Office action from U.S. Appl. No. 10/560,068 dated Aug. 1, 2008.
Office action from U.S. Appl. No. 10/560,068 dated Dec. 15, 2008.
Advisory Action from U.S. Appl. No. 10/560,068 dated Feb. 25, 2009.
Office action from U.S. Appl. No. 10/560,068 dated May 7, 2009.
Office action from U.S. Appl. No. 10/560,068 dated Nov. 5, 2009.
Advisory Action from U.S. Appl. No. 10/560,068 dated Mar. 16, 2010.
Panel Decision of Pre-Appeal Brief from U.S. Appl. No. 10/560,068 dated Apr. 29, 2010.
Examiner's Answer from U.S. Appl. No. 10/560,068 dated Aug. 3, 2010.
Notice of Allowance from U.S. Appl. No. 11/267,702 dated Jul. 29, 2009.
Office action from U.S. Appl. No. 11/267,702 dated Dec. 3, 2009.
Notice of Allowance from U.S. Appl. No. 11/267,702 dated Jun. 16, 2010.
Notice of Allowance from U.S. Appl. No. 11/267,739 dated Jul. 13, 2009.
Office action from U.S. Appl. No. 11/267,739 dated Dec. 3, 2009.
Notice of Allowance from U.S. Appl. No. 11/267,739 dated Apr. 7, 2010.
Office action from U.S. Appl. No. 11/722,039 dated Oct. 28, 2009.
Office action from U.S. Appl. No. 11/722,039 dated Jun. 22, 2010.
Interview Summary from U.S. Appl. No. 11/722,039 dated Sep. 21, 2010.
Office action from U.S. Appl. No. 11/722,039 dated Oct. 19, 2010.
Office action from U.S. Appl. No. 11/722,039 dated Jun. 7, 2011.
Office action from U.S. Appl. No. 12/341,985 dated Nov. 17, 2010.
Office action from U.S. Appl. No. 12/341,985 dated Apr. 21, 2011.
Notice of Allowance from U.S. Appl. No. 12/341,985 dated Oct. 12, 2011.
Office action from U.S. Appl. No. 12/344,130 dated Nov. 17, 2010.
Office action from U.S. Appl. No. 12/344,130 dated Apr. 20, 2011.
Notice of Allowance from U.S. Appl. No. 12/344,130 dated Oct. 11, 2011.
Office action from U.S. Appl. No. 12/403,955 dated Dec. 9, 2011.
Office action from U.S. Appl. No. 12/847,206 dated Feb. 22, 2011.
Office action from U.S. Appl. No. 12/847,206 dated Oct. 14, 2011.
Office action from U.S. Appl. No. 12/880,289 dated Jul. 20, 2011.
Notice of Allowance from U.S. Appl. No. 12/880,289 dated Dec. 22, 2011.
International Search Report from PCT/FR04/01431 dated Jun. 11, 2003.
International Search Report from PCT/FR05/51090 date Dec. 2, 2004.
International Search Report and Written Opinion from PCT/US09/68949 dated May 7, 2010.
International Search Report and Written Opinion from PCT/US09/68955 dated May 7, 2010.
International Search Report and Written Opinion from PCT/US09/68965 dated May 7, 2010.
Office action from Australian Application No. 2006312015 dated May 5, 2011.
Office action from Australian Application No. 2006312106 dated May 5, 2011.
Office action from Chinese Application No. 200580043075.7 dated Dec. 7, 2011.
Office action from Chinese Application No. 200680041104.0 dated Aug. 4, 2010.
Office action from Chinese Application No. 200680041104.0 dated Mar. 22, 2011.
Office action from Chinese Application No. 200680041104.0 dated Jul. 14, 2011.
Office action from European Application No. 01987549.1 dated Aug. 5, 2011.
Office action from European Application No. 05825565.4 dated Dec. 14, 2007.
Office action from European Application No. 05825565.4 dated Nov. 19, 2010.
Office action from European Application No. 05825565.4 dated May 9, 2011.
Office action from European Application No. 05825565.4 dated Mar. 31, 2011.
Communication from EP application No. 06827125.3 dated Jun. 4, 2009 which includes the EP OA from Feb. 13, 2009 and the Search Report dated Dec. 10, 2008.
Office action from Indian Application No. 2108/KOLNP/2007 dated Jun. 28, 2011.
Office action from Japanese Application No. 2007-546144 dated Sep. 13, 2011.
Office action from Korean Application No. 2003-7005873 dated Jun. 26, 2007.
Office action from Korean Application No. 2003-7005873 dated Nov. 29, 2007.
Office action from Mexican Application No. 07/006989 dated Oct. 24, 2011.
Communication regarding Mexican Application No. 08/05816 dated Mar. 15, 2011.
Office action from Mexican Application No. 08/005819 dated Mar. 16, 2011.
Office action from Mexican Application No. 08/005819 dated Jun. 3, 2011.
Office action from Russian Application No. 2008117091 dated Apr. 19, 2010.
Office action from Russian Application No. 2008117091 dated Dec. 13, 2010.
Office action from Russian Application No. 2008117092 dated Oct. 12, 2011.
Aslanova, "Steklyannye volokna", Glass Fibers, Moscow, Khimiya, 1979, I, 256 pp. pp. 33, 34, Fig. 3.2).
Chernyak et alo. "Nepreryvnoe steklyannoe volokno" Continuous Glass Fiber, Moscow, Khimiya, 1965.

(56) References Cited

OTHER PUBLICATIONS

Popov, et al., "Proizvodstvo i primenenie plavlenolitykh ogneuporov", Manufacture and Application of Molten Cast Refractory Materials, Moscow, Metallurgiya, 1985, IV, p. 212-213.
Office action from U.S. Appl. No. 11/722,039 dated Mar. 1, 2010.
Office action from Brazilian Application No. PI01149733 dated Mar. 10, 2009.
Office action from Canadian Application No. 2,528,923 dated Dec. 9, 2010 along with English translation of relevant portions of action.
Office action from Canadian Application No. 2,528,923 dated Jul. 12, 2011.
Office action from Chinese Application No. 200480015986.4 dated Jul. 6, 2007.
Office action from Chinese Application No. 200580043075.7 dated Feb. 5, 2010.
Office action from Chinese Application No. 200680041114.4 dated Feb. 29, 2012.
Office action from European Application No. 04767297.7 dated Sep. 8, 2006.
Search Report from French Registration No. 635569 (FR 0306981) dated Feb. 13, 2004.
Search Report from French Registration No. 658923 (FR 0413443) dated Aug. 16, 2005.
Office action from Indian Application No. 00501/KOLNP/2003 dated Jul. 7, 2006.
Office action from Indian Application No. 00501/KOLNP/2003 dated May 14, 2007.
Office action from Indian Application No. 2546/KOLNP/2005 dated Jun. 15, 2007.
Office action from Japanese Application No. 2002-544374 dated Sep. 28, 2007.
Office action from Japanese Application No. 2002-544374 dated Jul. 27, 2009.
Office action from Japanese Application No. 2002-544374 dated Jul. 12, 2010.
Office action from Japanese Application No. 2006-516274 dated Jun. 22, 2010.
Office action from Japanese Application No. 2006-516274 dated Feb. 22, 2011.
Office action from Korean Application No. 10-2005-7023679 dated Mar. 3, 2011.
Office action from Mexican Application No. PA/a/2002/000814 dated Feb. 22, 2006.
Office action from Mexican Application No. PA/a/2002/00814 dated Sep. 9, 2005.
Office action from Mexican Application No. PA/a/2002/00814 dated Jun. 23, 2005.
Office action from Mexican Application No. PA/a/2002/00814 dated Sep. 26, 2002.
Office action from Mexican Application No. 05/013323 dated Feb. 27, 2006.
Office action from Mexican Application No. 05/013323 dated May 29, 2009.
Office action from Mexican Application No. 07/06989 dated Aug. 22, 2007.
Office action from Russian Application No. 2007126843 dated Sep. 24, 2009.
Office action from Russian Application No. 2007126843 dated Dec. 11, 2009.
Office action from Canadian Application No. 2,426,637 dated Aug. 28, 2008.
Office action from Russian Application No. 2006100296/03 dated Jun. 8, 2008.
Office action from Russian Application No. 2006100296/03 dated Nov. 26, 2008.
Office action from U.S. Appl. No. 12/403,955 dated Apr. 24, 2012.
Office action from Taiwanese Application No. 094144552 dated May 7, 2012.
Notice of Allowance from U.S. Appl. No. 12/344,130 dated Jun. 7, 2012.
Notice of Allowance from U.S. Appl. No. 12/341,985 dated Jun. 11, 2012.
Office action from Russian Application No. 2008117093/03 dated Apr. 26, 2012.
Office action from Korean Application No. 2008-7010726 dated Nov. 14, 2012.
Office action from Korean Application No. 2008-7010727 dated Nov. 14, 2012.
Office action from Mexican Application No. 07/06989 dated Jun. 26, 2012.
Office action from Japanese Application No. 2008-540053 dated Jul. 30, 2012.
Office action from Japanese Application No. 2008-540052 dated Jul. 30, 2012.
Office action from Korean Application No. 10-2007-7016026 dated Aug. 9, 2012.
Office action from U.S. Appl. No. 12/643,411 dated Aug. 17, 2012.
Office action from U.S. Appl. No. 11/722,039 dated Aug. 24, 2012.
Lund, "Tensile strength of glass fibers", dated Feb. 18, 2010.
Office action from Chinese Application No. 200680041104.0 dated Sep. 13, 2012.
Notice of Allowance from U.S. Appl. No. 12/880,289 dated Aug. 31, 2012.
Office action from Japanese Application No. 2009-533917 dated Sep. 24, 2012.
Notice of Allowance from U.S. Appl. No. 12/341,985 dated Oct. 11, 2012.
Appeal Decision from U.S. Appl. No. 10/560,068 dated Aug. 15, 2012.
Office action from Canadian Application No. 2,626,733 dated Oct. 9, 2012.
Office action from European Application No. 09796243.5 dated Oct. 2, 2012.
Office action from Chinese Application No. 20680041104.0 dated Jun. 13, 2012.
Office action from Canadian Application No. 2,591,026 dated May 15, 2012 along with English translation of relevant portions of action.
English Translation of JP Patent No. 2002-154843. Foreign patent along with English abstract previously submitted.
Office action from U.S. Appl. No. 12/643,411 dated Jan. 28, 2013.
Office action from Chinese Application No. 200680041104.0 dated Jan. 14, 2013.
Office action from Mexican Application No. 11/06712 dated Feb. 1, 2013 along with English translation of relevant portions of action.
Office action from Chinese Application No. 200680041114.4 dated Oct. 24, 2012.
Office action from European Application No. 09796559.4 dated Dec. 19, 2012.
Office action from Indian Application No. 1733/KOLNP/2008 dated Dec. 6, 2012.
Office action and Search Report from Taiwanese Application No. 95139183 dated Nov. 5, 2012 along with English translation of relevant portions of action.
Office action and Search Report from Taiwanese Application No. 95139185 dated Oct. 24, 2012 along with English translation of relevant portions of action.
Office action from Chinese Application No. 200680041114.4 dated Mar. 25, 2013.
Office action from Korean Application No. 10-2007-7016026 dated Feb. 25, 2012.
Notice of Allowance from U.S. Appl. No. 12/847,206 dated Apr. 8, 2013.
Refusal Decision from Russian Application No. 2008117092/03 dated Mar. 15, 2013.
Office action from Brazilian Application No. PI0411336-5 dated Apr. 5, 2013.
Office action from Canadian Application No. 2,591,026 dated Mar. 25, 2013.
Office action from Chinese Application No. 200980156454.5 dated Apr. 11, 2013.
Office action from Chinese Application No. 200980156910.6 dated Apr. 16, 2013.
Office action from U.S. Appl. No. 12/989,225 dated Nov. 19, 2012.

(56) References Cited

OTHER PUBLICATIONS

Notice of Allowance from U.S. Appl. No. 12/989,225 dated Mar. 11, 2013.
Office action from Saudi Arabian Application No. 109300629 dated Jun. 5, 2013 along with English translation of relevant portions of action.
Office action from Indian Application No. 1732/KOLNP/2008 dated Mar. 15, 2013.
Office action from Chinese Application No. 200580043075.7 dated May 2, 2013.
Notice of Allowance from U.S. Appl. No. 12/847,206 dated Jul. 5, 2013.
Examiner's Answer from U.S. Appl. No. 11/722,039 dated Jul. 26, 2013.
Office action from Chinese Application No. 200680041114.4 dated Jul. 1, 2013.
Office action from Mexican Application No. 07/006989 dated Jun. 19, 2013.
Office action from Canadian Application No. 2,626,732 dated Jun. 13, 2013.
Office action from Canadian Application No. 2,626,733 dated Jun. 27, 2013.

* cited by examiner

COMPOSITION FOR HIGH PERFORMANCE GLASS, HIGH PERFORMANCE GLASS FIBERS AND ARTICLES THEREFROM

CROSS REFERENCE TO RELATED APPLICATIONS

This application is a continuation-in-part of U.S. patent application Ser. No. 11/267,739 entitled "Composition For High Performance Glass, High Performance Glass Fibers, and Articles Therefrom" filed Nov. 4, 2005, the content of which is incorporated by reference in its entirety.

TECHNICAL FIELD AND INDUSTRIAL APPLICABILITY OF THE INVENTION

The present invention relates generally to a composition for continuous glass fibers, and more particularly to a glass composition for use in high-strength applications as well as high-strength glass fibers and articles that have non-corrosive properties.

BACKGROUND OF THE INVENTION

Fiberglass is manufactured from various raw materials combined in specific proportions to yield a desired chemical composition. This proportion is commonly termed a "glass batch." The composition of the glass batch and the glass manufactured from it are typically expressed in terms of percentages of the components, which are expressed as oxides. $SiO_2$, $Al_2O_3$, CaO, MgO, $B_2O$, $Na_2O$, $K_2O$, $Fe_2O_3$, and minor amounts of other oxides are common components of a glass batch. Numerous types of glasses may be produced from varying the amounts of these oxides, or eliminating some of the oxides, in the glass batch. Examples of such glasses that may be produced include E-glass, S-glass, R-glass, and E-CR-glass. The glass composition determines the properties of the glass including properties such as the viscosity, the liquidus temperature, the durability, the density, the strength, and the Young's modulus of the glass.

To form glass fibers, typically the glass batch is melted, the molten glass is drawn into filaments through a bushing or orifice plate, and an aqueous sizing composition containing lubricants, coupling agents, and film-forming binder resins is applied to the filaments. After the sizing composition is applied, the fibers may be gathered into one or more strands and wound into a package or, alternatively, the fibers may be chopped while wet and collected. The collected chopped strands may then be dried and cured to form dry chopped fibers or they can be packaged in their wet condition as wet chopped fibers.

The most common glass composition for making continuous glass fiber strands is "E-glass." The liquidus temperature of E-glass is approximately 2100° F. (1149° C.) or lower. One advantage of E-glass is that its liquidus temperature allows operating temperatures for producing glass fibers to be approximately 1900° F. to 2400° F. (1038° C. to 1316° C.). The ASTM D578 classification for E-glass fiber yarns used in printed circuit boards and aerospace applications defines the composition to be 52 to 56 weight % $SiO_2$, 16 to 25 weight % CaO, 12 to 16 weight % $Al_2O_3$, 5 to 10 weight % $B_2O_3$, 0 to 5 weight % MgO, 0 to 2 weight % $Na_2O$ and $K_2O$, 0 to 0.8 weight % $TiO_2$, 0.05 to 0.4 weight % $Fe_2O_3$ and 0 to 1.0 weight % Fluorine. The phrase weight %, as used herein, is intended to be defined as the percent by weight of the total composition.

Boron-free fibers are sold under the trademark ADVANTEX (Owens Corning, Toledo, Ohio, USA). Boron-free fibers, such as are disclosed in U.S. Pat. No. 5,789,329 to Eastes, et al., which is incorporated herein by reference in its entirety, offer a significant improvement in operating temperatures over boron-containing E-glass. Boron-free glass fibers fall under the ASTM D578 definition for E-glass fibers for use in general-use applications. In particular, the ASTM D578 classification for E-glass fibers for use in general use applications defines the composition to be 52 to 62 weight % $SiO_2$, 16 to 25 weight % CaO, 12 to 16 weight % $Al_2O_3$, 0 to 10 weight % $B_2O_3$, 0 to 5 weight % MgO, 0 to 2 weight % $Na_2O$ and $K_2O$, 0 to 1.5 weight % $TiO_2$, 0.05 to 0.8 weight % $Fe_2O_3$ and 0 to 1.0 weight % Fluorine.

S-glass is a family of glasses composed primarily of the oxides of magnesium, aluminum, and silicon with a chemical composition that produces glass fibers that have a higher mechanical strength than E-glass fibers. The composition for forming S-glass includes approximately 65 weight % $SiO_2$, 25 weight % $Al_2O_3$, and 10 weight % MgO. S-glass has a composition that was originally designed to be used in high-strength applications such as ballistic armor.

R-glass is a family of glasses that are composed primarily of the oxides of silicon, aluminum, magnesium, and calcium with a chemical composition that produces glass fibers with a higher mechanical strength than E-glass fibers. R-glass has a composition that contains about 58 to about 60 weight % $SiO_2$, about 23.5 to about 25.5 weight % $Al_2O_3$, about 14 to about 17 weight % CaO plus MgO, 0% $B_2O_3$, 0% $F_2$ and less than about 2 weight % of miscellaneous components. R-glass contains more alumina and silica than E-glass and requires higher melting and processing temperatures during fiber forming. Typically, the melting and processing temperatures for R-glass are at least about 160° C. higher than those for E-glass. This increase in processing temperature requires the use of a high-cost platinum-lined melter. In addition, the close proximity of the liquidus temperature to the forming temperature in R-glass requires that the glass be fiberized at a viscosity lower than E-glass, which is customarily fiberized at or near about 1000 poise. Fiberizing R-glass at the customary 1000 poise viscosity would likely result in glass devitrification, which causes process interruptions and reduced productivity.

Tables 1A-1E set forth the compositions for a number of conventional high-strength glass compositions.

TABLE 1-A

| Constituent | Chinese High Strength glass | RUSSIAN CONTINUOUS ROVING MAGNESIUM ALUMINOSILICATE | NITTOBO "T" Glass Fabric "B" | NITTOBO "T" Glass Fabric (Yarn) "C" |
|---|---|---|---|---|
| $SiO_2$ | 55.08 | 55.81 | 64.58 | 64.64 |
| CaO | 0.33 | 0.38 | 0.44 | 0.40 |
| $Al_2O_3$ | 25.22 | 23.78 | 24.44 | 24.57 |
| $B_2O_3$ | 1.85 | 0.00 | 0.03 | 0.03 |
| MgO | 15.96 | 15.08 | 9.95 | 9.92 |
| $Na_2O$ | 0.12 | 0.063 | 0.08 | 0.09 |
| Fluorine | 0.03 | 0.00 | 0.034 | 0.037 |
| $TiO_2$ | 0.023 | 2.33 | 0.019 | 0.018 |
| $Fe_2O_3$ | 1.1 | 0.388 | 0.187 | 0.180 |
| $K_2O$ | 0.039 | 0.56 | 0.007 | 0.010 |
| $ZrO_2$ | 0.007 | 0.15 | 0.00 | 0.00 |
| $Cr_2O_3$ | 0.00 | 0.011 | 0.003 | 0.003 |
| $Li_2O$ | 0.00 | 1.63 | 0.00 | 0.00 |
| $CeO_2$ | 0.00 | 0.00 | 0.00 | 0.00 |

TABLE 1-B

| Constituent | Nitto Boseki A&P Yarn | Nitto Boseki NT6030 Yarn | Nitto Boseki TE Glass RST-220PA-535CS | Vetrotex Saint Gobain SR Glass Stratifils SR CG 250 P109 | Polotsk STEKLOVO-LOKNO High Strength Glass |
|---|---|---|---|---|---|
| SiO$_2$ | 65.51 | 64.60 | 64.20 | 63.90 | 58.64 |
| CaO | 0.44 | 0.58 | 0.63 | 0.26 | 0.61 |
| Al$_2$O$_3$ | 24.06 | 24.60 | 25.10 | 24.40 | 25.41 |
| B$_2$O$_3$ | 0.00 | 0.00 | 0.00 | 0.00 | 0.04 |
| MgO | 9.73 | 9.90 | 9.90 | 10.00 | 14.18 |
| Na$_2$O | 0.04 | 0.06 | 0.020 | 0.039 | 0.05 |
| Fluorine | 0.07 | 0.00 | 0.00 | 0.00 | 0.02 |
| TiO$_2$ | 0.016 | 0.000 | 0.000 | 0.210 | 0.624 |
| Fe$_2$O$_3$ | 0.067 | 0.079 | 0.083 | 0.520 | 0.253 |
| K$_2$O | 0.020 | 0.020 | 0.020 | 0.540 | 0.35 |
| ZrO$_2$ | 0.079 | 0.00 | 0.00 | 0.00 | 0.00 |
| Cr$_2$O$_3$ | 0.0010 | 0.00 | 0.00 | 0.001 | 0.023 |
| Li$_2$O | 0.00 | 0.00 | 0.00 | 0.00 | 0.00 |
| CeO$_2$ | 0.00 | 0.00 | 0.00 | 0.00 | 0.00 |

TABLE 1-C

| Constituent | Chinese High Strength Yarn (8 micron) | Chinese High Strength Glass Roving | Zentron S-2 Glass Roving | SOLAIS Glass Sample | Advanced Glass Yarns R Glass |
|---|---|---|---|---|---|
| SiO$_2$ | 55.22 | 55.49 | 64.74 | 64.81 | 58.46 |
| CaO | 0.73 | 0.29 | 0.14 | 0.55 | 9.39 |
| Al$_2$O$_3$ | 24.42 | 24.88 | 24.70 | 24.51 | 24.55 |
| B$_2$O$_3$ | 3.46 | 3.52 | 0.00 | 0.02 | 0.04 |
| MgO | 12.46 | 12.28 | 10.24 | 9.35 | 5.91 |
| Na$_2$O | 0.104 | 0.06 | 0.17 | 0.16 | 0.079 |
| Fluorine | 0.07 | 0.00 | 0.00 | 0.02 | 0.054 |
| TiO$_2$ | 0.32 | 0.36 | 0.015 | 0.04 | 0.196 |
| Fe$_2$O$_3$ | 0.980 | 0.930 | 0.045 | 0.238 | 0.400 |
| K$_2$O | 0.240 | 0.150 | 0.005 | 0.03 | 0.67 |
| ZrO$_2$ | 0.00 | 0.00 | 0.00 | 0.00 | 0.00 |
| Cr$_2$O$_3$ | 0.0050 | 0.00 | 0.00 | 0.007 | 0.005 |
| Li$_2$O | 0.59 | 0.63 | 0.00 | 0.00 | 0.00 |
| CeO$_2$ | 1.23 | 1.25 | 0.00 | 0.00 | 0.00 |

TABLE 1-D

| Constituent | Advanced Glass Yarns S Glass | Culimeta Roving | IVG Vertex B96 675 Yarn | IVG Vertex Glass Roving | IVG Vertex Outside #1 Glass Roving |
|---|---|---|---|---|---|
| SiO$_2$ | 64.61 | 59.37 | 58.34 | 58.58 | 58.12 |
| CaO | 0.17 | 0.27 | 0.31 | 0.30 | 0.31 |
| Al$_2$O$_3$ | 24.84 | 25.49 | 23.81 | 24.26 | 24.09 |
| B$_2$O$_3$ | 0.04 | 0.05 | 0.00 | 0.00 | 0.00 |
| MgO | 10.11 | 13.47 | 14.99 | 15.02 | 15.36 |
| Na$_2$O | 0.118 | 0.024 | 0.05 | 0.02 | 0.03 |
| Fluorine | 0.03 | 0.00 | 0.04 | 0.04 | 0.04 |
| TiO$_2$ | 0.011 | 0.530 | 1.380 | 0.67 | 0.91 |
| Fe$_2$O$_3$ | 0.042 | 0.374 | 0.333 | 0.336 | 0.303 |
| K$_2$O | 0.00 | 0.48 | 0.42 | 0.28 | 0.29 |
| ZrO$_2$ | 0.00 | 0.152 | 0.129 | 0.165 | 0.157 |
| Cr$_2$O$_3$ | 0.0050 | 0.0120 | 0.0100 | 0.0120 | 0.0120 |
| Li$_2$O | 0.00 | 0.00 | 0.00 | 0.00 | 0.00 |
| CeO$_2$ | 0.00 | 0.00 | 0.00 | 0.00 | 0.00 |

TABLE 1-E

| Constituent | IVG Vertex Outside #2 Glass Roving | RH CG250 P109 Glass Fiber Strand |
|---|---|---|
| SiO$_2$ | 58.69 | 58.54 |
| CaO | 0.29 | 9.35 |
| Al$_2$O$_3$ | 24.3 | 25.39 |
| B$_2$O$_3$ | 0.00 | 0.00 |
| MgO | 15.06 | 6.15 |
| Na$_2$O | 0.03 | 0.10 |
| Fluorine | 0.04 | 0.16 |
| TiO$_2$ | 0.64 | 0.008 |
| Fe$_2$O$_3$ | 0.331 | 0.069 |
| K$_2$O | 0.36 | 0.14 |
| ZrO$_2$ | 0.187 | 0.006 |
| Cr$_2$O$_3$ | 0.0130 | 0.00 |
| Li$_2$O | 0.00 | 0.00 |
| CeO$_2$ | 0.00 | 0.00 |

Glass fibers formed from compositions such as those described above are used in a variety of applications. For example, glass fibers are commonly used as reinforcements in polymer matrices to form glass fiber reinforced plastics or composites. The glass fibers may be used to form structural composites such as door liners or hoodliners for automobiles, storage drums, aircraft flooring, wind turbine blades, and pressure vessels. Alternatively, the glass fibers may be used to form non-structural articles such as automobile panels, insulator rods, and ballistic panels. In some situations, such as storage drums formed from glass fibers, wind turbine blades, and pressure vessels, the glass fibers may come into contact with a corrosive substance, such as corrosive chemicals or saltwater. It is therefore desirable to have a glass composition that can be utilized to form glass fiber composite articles that are non-corrosive in nature and which optimally possess adequate strength for the desired application. Further, the costs of forming R-glass and S-glass fibers are dramatically higher than E-glass fibers due to the cost of producing these fibers in a platinum-lined melter.

Thus, there exists a need in the art for glass compositions useful in the formation of non-corrosive, high performance fibers that can be formed by a direct-melt process in a refractory-lined furnace.

SUMMARY OF THE INVENTION

The invention, in part, is a glass composition for the formation of continuous glass fibers that are suitable for use in high-strength applications. The composition of the present invention may be inexpensively formed into glass fibers using low-cost, direct melting in refractory-lined furnaces due to the relatively low fiberizing temperature of the glass fibers. Once formed into fibers, the glass composition provides the strength characteristics of higher-priced glass fibers such as S-glass. The composition of the present invention includes about 60.5 to about 70.5 weight % SiO$_2$, about 10.0 to about 24.5 weight % Al$_2$O$_3$, about 6.0 to about 20.0 weight % RO, where RO equals the sum of MgO, CaO, SrO and BaO, and about 0.0 to about 3.0 weight % alkali metal oxides. In a preferred embodiment, the glass composition is composed of about 61 to about 68 weight % SiO$_2$, about 15 to about 19 weight % Al$_2$O$_3$, about 15 to about 20 weight % RO, where RO equals the sum of MgO, CaO, SrO and BaO, and about 0 to about 3 weight % alkali metal oxides. The composition preferably does not contain more than about 4 weight % of oxides or halogens selected from the group consisting of ZnO, SO$_3$, Fluorine, B$_2$O$_3$, TiO$_2$, ZrO$_2$ and Fe$_2$O$_3$. The desired properties of the glass composition of the present invention include a fiberizing temperature of less than about 2650° F. and a liquidus temperature that is preferably below the fiberizing temperature by at least about 80° F., more preferably by at least about 120° F., and most preferably by at least about 150° F. Additionally, fibers produced from the inventive composition are non-corrosive or substantially (e.g., nearly) non-corrosive in nature. The non-corrosive properties of the glass fibers formed from the inventive composition permit the glass fibers to be used in applications in which the fibers are in contact with corrosive substances.

It is an advantage of the present invention that glass fibers formed from the inventive composition can be melted in a refractory-lined melter because both its melting and fiberizing temperatures are below the upper use temperatures of conventional refractories.

It is another advantage of the present invention that glass fibers formed from the inventive composition possess corrosion-resistant properties.

It is yet another advantage of the present invention that the glass composition has a lower fiberizing temperature that allows for a higher throughput, which reduces production costs.

It is a feature of the present invention that glass fibers formed from the inventive composition have a fiberizing temperature of less than about 2650° F., a ΔT of at least about 80° F., and a coefficient of thermal expansion (CTE) of about $2.28 \times 10^{-6}$ in/in/° F. to about $2.77 \times 10^{-6}$ in/in/° F.

It is another feature of the present invention that glass fibers made from the inventive composition possess corrosion resistant properties that are equal to or better than E-glass and boron-free glass fibers.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Figure 1:
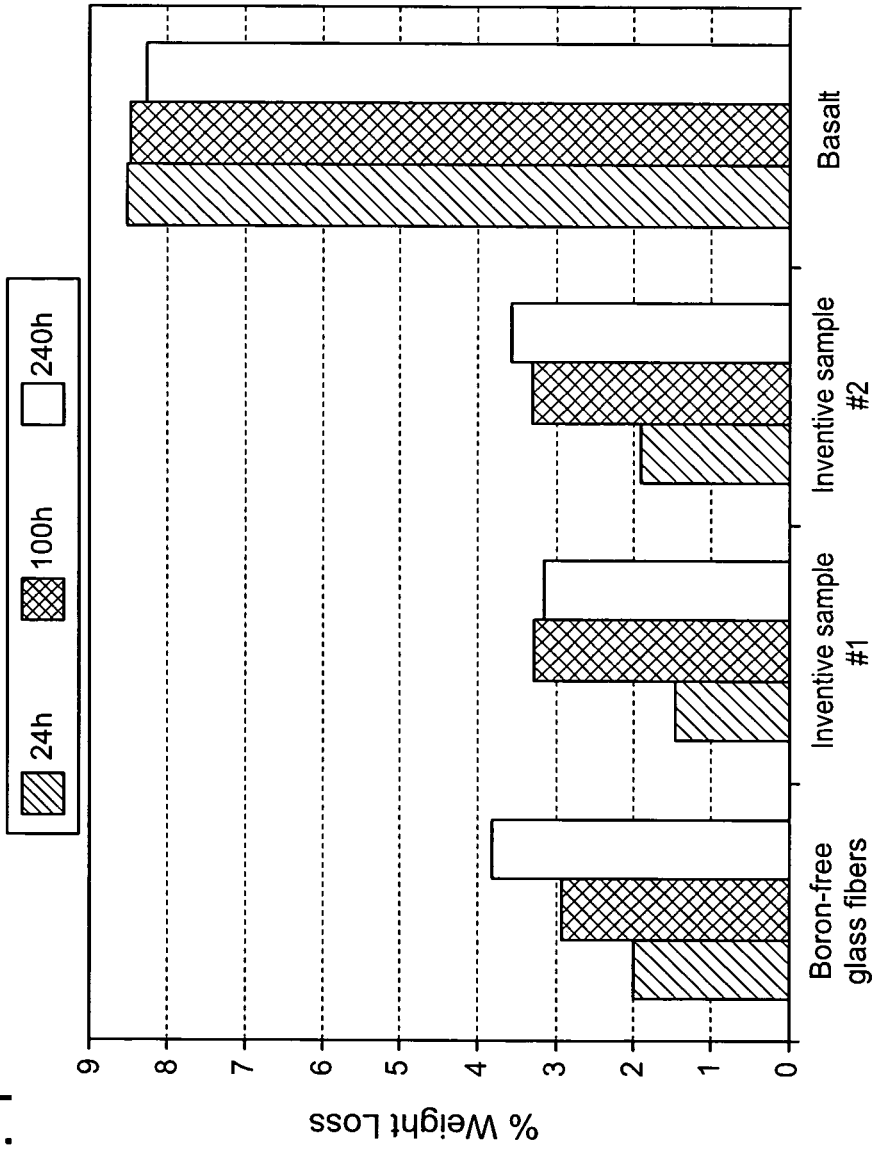
FIG. 1 is a graphical illustration of the percentage of weight loss of glass fibers and basalt after immersion in 10% nitric acid at 96° C. for 24 hours, 100 hours, and 240 hours.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references. It is to be appreciated that in the drawings, the thickness of the lines, layers, and regions may be exaggerated for clarity.

Fiberizing properties of the glass composition of the present invention include the fiberizing temperature, the liquidus temperature, and delta-T. The fiberizing temperature is defined as the temperature that corresponds to a viscosity of about 1000 Poise. As discussed in more detail below, a lowered fiberizing temperature reduces the production cost of the fibers, allows for a longer bushing life, increases throughput, permits the glass to be melted in a refractory-lined melter, and reduces energy usage. For example, at a lower fiberizing temperature, a bushing operates at a cooler temperature and does not "sag" as quickly. Sag is a phenomenon that occurs in bushings that are held at an elevated temperature for extended periods of time. By lowering the fiberizing temperature, the sag rate of the bushing may be reduced and the bushing life can be increased. In addition, a lower fiberizing temperature allows for a higher throughput since more glass can be melted in a given period at a given energy input. As a result, production cost is reduced. In addition, a lower fiberizing temperature will also permit glass formed with the inventive composition to be melted in a refractory-lined melter since both its melting and fiberizing temperatures are below the upper use temperatures of many commercially available refractories.

The liquidus temperature is defined as the highest temperature at which equilibrium exists between liquid glass and its primary crystalline phase. At all temperatures above the liquidus temperature, the glass is free from crystals in its primary phase. At temperatures below the liquidus temperature, crystals may form.

Another fiberizing property is delta-T (ΔT), which is defined as the difference between the fiberizing temperature and the liquidus temperature. A larger ΔT offers a greater degree of flexibility during the formation of the glass fibers and helps to inhibit devitrification of the glass (that is, the formation of crystals within the melt) during melting and fiberizing. Increasing the ΔT also reduces the production cost of the glass fibers by allowing for a greater bushing life and by providing a wider process window for forming fibers.

The glasses of the present invention are suitable for melting in traditional commercially available refractory-lined glass melters, which are widely used in the manufacture of glass reinforcement fibers. Starting batch components typically include $SiO_2$ (ground silica sand), and $Al_2O_3$ (calcined alumina), as well as chain modifiers from source materials such as $MgCO_3$ (magnesite), $CaCO_3$ (limestone), $SrCO_3$ (strontianite), $BaCO_3$ (witherite), $ZrSiO_4$ (zircon), and $Na_2CO_3$ (natrite).

The glass batch is preferably composed of about 60.5 to about 70.5 weight percent $SiO_2$, about 10.0 to about 24.5 weight percent $Al_2O_3$, about 6.0 to about 20.0 weight percent RO, where RO equals the sum of MgO, CaO, and SrO, and about 0.0 to about 3.0 weight percent alkali metal oxides. The phrase weight percent, as used in conjunction with the present invention, is intended to be defined as the percent by weight of the total composition. A fiber formed in accordance with the present invention will typically also include small amounts of ZnO, $SO_3$, Fluorine, $B_2O_3$, $TiO_2$ and $Fe_2O_3$, preferably in an amount of less than 4 weight percent. It is to be appreciated that impurities or tramp materials may be present in the glass composition without adversely affecting the glasses or the fibers. These impurities may enter the glass as raw material impurities or may be products formed by the chemical reaction of the molten glass with furnace components.

In general, glass fibers according to the present invention may be formed by obtaining the raw materials or ingredients and mixing or blending the components in a conventional manner in the appropriate quantities to give the desired weight percentages of the final composition. The mixed batch may then be melted in a refractory-lined melter, and the resulting molten glass may be passed along a forehearth and into platinum based bushings located along the bottom of the forehearth. The molten glass is pulled or attenuated through holes or orifices in the bottom or tip plate of the bushing to form individual glass filaments or fibers. Strands of glass fibers are formed by gathering the individual filaments together, such as with a gathering shoe. The strands are each formed of a plurality of individual glass filaments and may be wound on a forming tube mounted on a rotatable collet of a winding machine. The glass fibers may be further processed in a conventional manner suitable for the intended application.

A glass fiber formed in accordance with the present invention will preferably having a fiberizing temperature of less than about 2650° F., a ΔT of at least about 80° F., preferably a ΔT of at least about 120° F., and most preferably a ΔT of at least 150° F., and a coefficient of thermal expansion (CTE) of about $2.28 \times 10^{-6}$ in/in/° F. to about $2.77 \times 10^{-6}$ in/in/° F. Further, the glass fibers of the present invention preferably have a strength in excess of about 600 KPSI, preferably a strength in excess of about 630 KPSI, and most preferably a strength in excess of about 695 KPSI. Further, the glass fibers will desirably have a modulus greater than about 12.0 MPSI, preferably greater then about 12.18 MPSI, and most preferably greater then about 12.6 MPSI. It will be appreciated that certain details of construction are not provided in view of such details being conventional and well within the skill of the art.

The present invention also includes a composite material including glass fibers, as described above, in combination with a hardenable matrix material. The composite material is especially useful in applications where high strength, high stiffness, and low weight are desired. Such applications include aircraft, automotive, and wind energy (such as windmill blades) as well as any other application where low weight, stiffness, and high strength are desired. Suitable hardenable matrix materials include thermoset and thermoplastic resins. By way of example, suitable thermoset matrix materials include vinyl esters, polyesters, resin epoxies and combinations or copolymers thereof. Typically, windmill blades are formed by any suitable composite fabrication technique, such as vacuum-assisted resin infusion or pre-impregnated reinforcement lay-up.

Additionally, glass fibers formed from the inventive composition are non-corrosive or substantially non-corrosive in nature. Due to the non-corrosive nature of the glass fibers, glass fibers made in accordance with the present invention may be used in applications where the glass fibers or a composite formed from the glass fibers are in contact with a corrosive substance. Thus, the glass fibers may be used in applications such as chemical drums, grating, sail battens, and wind turbine blades.

Having generally described this invention, a further understanding can be obtained by reference to certain specific examples illustrated below which are provided for purposes of illustration only and are not intended to be all inclusive or limiting unless otherwise specified.

EXAMPLES

Example 1

Glass Formation

The glasses in the examples set forth in Tables 2A-2P were melted in platinum crucibles or in a continuous platinum-lined melter for determining the mechanical and physical properties of the glass and fibers produced therefrom. The units of measurement for the physical properties are: Viscosity (° F.), Liquidus temperature (° F.) and ΔT (° F.). In some examples the glasses were fiberized and Strength (KPsi), Density (g/cc), Modulus (MPsi), Softening Point (° F.) and coefficient of thermal expansion (CTE) (in/in/(° F.)) were measured.

The fiberizing temperature was measured using a rotating spindle viscometer. The fiberizing viscosity is defined as 1000 Poise. The liquidus temperature was measured by placing a platinum container filled with glass in a thermal gradient furnace for 16 hours. The greatest temperature at which crystals were present was considered the liquidus temperature. The modulus was measured using the sonic technique on a single fiber of glass. The tensile strength was measured on a pristine single fiber. The CTE was measured with a dilatometer over the range of temperature from 25 to 600° C. The softening point temperature was measured using the ASTM C338 fiber-elongation method.

TABLE 2-A

| Glass | Ex. 1 | Ex. 2 | Ex. 3 | Ex. 4 | Ex. 5 | Ex. 6 |
|---|---|---|---|---|---|---|
| $SiO_2$ | 62.63 | 62.42 | 61.75 | 63.01 | 63.07 | 63.16 |
| CaO | 8.49 | 8.64 | 8.57 | 4.84 | 4.85 | 4.8 |
| $Al_2O_3$ | 18.50 | 18.54 | 18.82 | 19.99 | 20.03 | 19.76 |
| MgO | 9.47 | 9.64 | 9.65 | 11.26 | 11.28 | 11.33 |
| $Na_2O$ | 0.70 | 0.69 | 0.00 | 0.70 | 0.70 | 0.00 |
| $TiO_2$ | 0.00 | 0.01 | 0.01 | 0.00 | 0.01 | 0.02 |
| $Fe_2O_3$ | 0.20 | 0.05 | 0.045 | 0.20 | 0.05 | 0.037 |
| Fluorine | 0.00 | 0.00 | 0.00 | 0.00 | 0.00 | 0.00 |
| Measured Viscosity (° F.) | 2491 | na | na | 2514 | na | na |
| Measured Liquidus Temp (° F.) | 2261 | 2247 | na | 2335 | na | na |
| Measured ΔT (° F.) | 230 | na | na | 179 | na | na |
| Measured Strength (KPsi) | 672 | na | na | 695 | na | na |
| Measured Density (g/cc) | 2.556 | na | na | 2.530 | na | na |
| Measured Modulus (MPsi) | 12.4 | 12.6 | na | 12.6 | 12.7 | na |
| Softening Point (° F.) | na | na | na | 1765 | na | na |
| CTE in/in/(° F.) | na | na | na | $2.28 \times 10^{-6}$ | na | na |

TABLE 2-B

| Glass | Ex. 7 | Ex. 8 | Ex. 9 | Ex. 10 | Ex. 11 | Ex. 12 |
|---|---|---|---|---|---|---|
| $SiO_2$ | 62.32 | 63.89 | 63.14 | 61.39 | 61.39 | 65.00 |
| CaO | 11.56 | 11.21 | 11.96 | 11.96 | 8.71 | 13.00 |
| $Al_2O_3$ | 17.25 | 16.39 | 16.39 | 18.14 | 18.89 | 15.00 |

TABLE 2-B-continued

| Glass | Ex. 7 | Ex. 8 | Ex. 9 | Ex. 10 | Ex. 11 | Ex. 12 |
|---|---|---|---|---|---|---|
| MgO | 7.98 | 6.62 | 6.62 | 6.62 | 9.62 | 5.00 |
| Na$_2$O | 0.70 | 0.75 | 0.75 | 0.75 | 0.25 | 1.00 |
| TiO$_2$ | 0.00 | 0.75 | 0.75 | 0.75 | 0.75 | 1.00 |
| Fe$_2$O$_3$ | 0.20 | 0.39 | 0.39 | 0.39 | 0.39 | 0.00 |
| Fluorine | 0.00 | 0.00 | 0.00 | 0.00 | 0.00 | 0.00 |
| Measured Viscosity (° F.) | 2458 | 2493 | 2435 | 2431 | 2434 | 2509 |
| Measured Liquidus Temp (° F.) | 2301 | 2268 | 2294 | 2353 | 2261 | 2226 |
| Measured ΔT (° F.) | 157 | 225 | 141 | 78 | 173 | 283 |
| Measured Strength (KPsi) | 632 | 636 | 622 | 615 | 682 | 612 |
| Measured Density (g/cc) | 2.573 | 2.553 | 2.567 | 2.567 | 2.564 | na |
| Measured Modulus (MPsi) | 12.2 | 12.2 | 12.2 | 12.2 | 12.6 | na |
| Softening Point (° F.) | 1729 | na | na | na | na | na |
| CTE in/in/(° F.) | 2.77 × 10$^{-6}$ | na | na | na | na | na |

TABLE 2-C

| Glass | Ex. 13 | Ex. 14 | Ex. 15 | Ex. 16 | Ex. 17 | Ex. 18 |
|---|---|---|---|---|---|---|
| SiO$_2$ | 63.89 | 65.00 | 64.00 | 63.89 | 65.00 | 65.00 |
| CaO | 6.96 | 14.00 | 4.00 | 8.96 | 14.00 | 12.50 |
| Al$_2$O$_3$ | 18.64 | 15.00 | 20.00 | 18.89 | 15.00 | 15.00 |
| MgO | 9.62 | 6.00 | 11.00 | 6.62 | 5.00 | 5.00 |
| Na$_2$O | 0.25 | 0.00 | 1.00 | 0.75 | 0.00 | 1.00 |
| TiO$_2$ | 0.25 | 0.00 | 0.00 | 0.75 | 1.00 | 1.00 |
| Fe$_2$O$_3$ | 0.39 | 0.00 | 0.00 | 0.14 | 0.00 | 0.50 |
| Fluorine | 0.00 | 0.00 | 0.00 | 0.00 | 0.00 | 0.00 |
| Measured Viscosity (° F.) | 2513 | 2508 | 2548 | 2565 | 2481 | 2523 |
| Measured Liquidus Temp (° F.) | 2337 | 2373 | 2401 | 2288 | 2403 | 2227 |
| Measured ΔT (° F.) | 176 | 135 | 147 | 277 | 78 | 296 |
| Measured Strength (KPsi) | 695 | 624 | na | na | 604 | na |
| Measured Density (g/cc) | 2.480 | 2.554 | na | na | 2.546 | na |
| Measured Modulus (MPsi) | 12.3 | 12.0 | na | na | 11.9 | na |
| Softening Point (° F.) | na | na | na | na | na | na |
| CTE in/in/(° F.) | na | na | na | na | na | na |

TABLE 2-D

| Glass | Ex. 19 | Ex. 20 | Ex. 21 | Ex. 22 | Ex. 23 | Ex. 24 |
|---|---|---|---|---|---|---|
| SiO$_2$ | 64.50 | 65.00 | 65.00 | 65.00 | 65.00 | 65.00 |
| Al$_2$O$_3$ | 15.00 | 15.00 | 20.00 | 20.00 | 20.00 | 20.00 |
| CaO | 14.00 | 13.50 | 4.00 | 7.50 | 4.00 | 9.00 |
| MgO | 5.00 | 5.00 | 11.00 | 5.00 | 10.50 | 5.00 |
| Na$_2$O | 1.00 | 0.00 | 0.00 | 1.00 | 0.00 | 1.00 |
| TiO$_2$ | 0.00 | 1.00 | 0.00 | 1.00 | 0.00 | 0.00 |
| Fe$_2$O$_3$ | 0.50 | 0.50 | 0.00 | 0.50 | 0.50 | 0.00 |
| Fluorine | 0.00 | 0.00 | 0.00 | 0.00 | 0.00 | 0.00 |
| Measured Viscosity (° F.) | 2515 | 0.00 | 0.00 | 0.00 | 0.00 | 0.00 |
| Measured Liquidus Temp (° F.) | 2258 | 2530 | 2594 | 2672 | 2602 | 2642 |
| Measured ΔT (° F.) | 257 | 2395 | 2487 | 2347 | 2481 | 2391 |
| Measured Strength (KPsi) | 593 | 612 | na | na | na | na |
| Measured Density (g/cc) | 2.538 | 2.560 | na | na | na | na |
| Measured Modulus (MPsi) | 11.82 | 12.00 | na | na | na | na |
| Softening Point (° F.) | na | na | na | 1819 | na | na |
| CTE in/in/(° F.) | na | na | na | 2.33 | na | na |

TABLE 2-E

| Glass | Ex. 25 | Ex. 26 | Ex. 27 | Ex. 28 | Ex. 29 | Ex. 30 |
|---|---|---|---|---|---|---|
| SiO$_2$ | 63.89 | 63.89 | 63.89 | 63.89 | 63.89 | 61.39 |
| Al$_2$O$_3$ | 16.39 | 18.89 | 18.89 | 18.89 | 17.89 | 18.89 |
| CaO | 11.96 | 9.96 | 9.21 | 6.96 | 6.96 | 8.46 |
| MgO | 6.62 | 6.62 | 6.62 | 9.12 | 9.62 | 9.62 |
| Na$_2$O | 0.50 | 0.25 | 0.75 | 0.25 | 0.75 | 0.75 |
| TiO$_2$ | 0.25 | 0.25 | 0.25 | 0.75 | 0.75 | 0.75 |
| Fe$_2$O$_3$ | 0.39 | 0.14 | 0.39 | 0.14 | 0.14 | 0.14 |
| Fluorine | 0.00 | 0.00 | 0.00 | 0.00 | 0.00 | 0.00 |
| Measured Viscosity (° F.) | 2486 | 2509 | 2522 | 2525 | 2495 | 2417 |
| Measured Liquidus Temp (° F.) | 2287 | 2312 | 2327 | 2348 | 2267 | 2273 |
| Measured ΔT (° F.) | 199 | 197 | 195 | 177 | 228 | 144 |
| Measured Strength (KPsi) | 631 | na | 628 | 670 | 651 | 648 |
| Measured Density (g/cc) | 2.547 | na | 2.526 | 2.540 | 2.544 | 2.574 |
| Measured Modulus (MPsi) | 12.16 | na | 12.08 | 12.32 | 12.43 | 12.42 |
| Softening Point (° F.) | na | na | na | na | na | na |
| CTE in/in/(° F.) | na | na | na | na | na | na |

TABLE 2-F

| Glass | Ex. 31 | Ex. 32 | Ex. 33 | Ex. 34 | Ex. 35 | Ex. 36 |
|---|---|---|---|---|---|---|
| SiO$_2$ | 65.00 | 65.00 | 65.00 | 65.00 | 65.00 | 62.85 |
| Al$_2$O$_3$ | 15.00 | 15.00 | 15.00 | 15.00 | 15.00 | 19.92 |
| CaO | 14.00 | 14.00 | 6.50 | 7.50 | 8.00 | 4.62 |
| MgO | 5.00 | 5.00 | 11.00 | 11.00 | 11.00 | 11.36 |
| Na$_2$O | 0.00 | 0.50 | 1.00 | 1.00 | 1.00 | 0.72 |
| TiO$_2$ | 0.50 | 0.00 | 1.00 | 0.00 | 0.00 | 0.02 |
| Fe$_2$O$_3$ | 0.50 | 0.50 | 0.50 | 0.50 | 0.00 | 0.04 |
| Fluorine | 0.00 | 0.00 | 0.00 | 0.00 | 0.00 | 0.02 |
| Measured Viscosity (° F.) | 2446 | 2468 | 2458 | 2467 | 2461 | 2527 |
| Measured Liquidus Temp (° F.) | 2391 | 2367 | 2396 | 2359 | 2461 | 2479 |
| Measured ΔT (° F.) | 55 | 101 | 62 | 108 | 0 | 48 |

TABLE 2-F-continued

| Glass | Ex. 31 | Ex. 32 | Ex. 33 | Ex. 34 | Ex. 35 | Ex. 36 |
|---|---|---|---|---|---|---|
| Measured Strength (KPsi) | 623 | 611 | na | na | 640 | na |
| Measured Density (g/cc) | 2.523 | 2.542 | na | na | na | na |
| Measured Modulus (MPsi) | 11.74 | 11.92 | na | na | na | na |
| Softening Point (° F.) | na | na | na | na | na | na |
| CTE in/in/(° F.) | na | na | na | na | na | na |

TABLE 2-G

| Glass | Ex. 37 | Ex. 38 | Ex. 39 | Ex. 40 | Ex. 41 | Ex. 42 |
|---|---|---|---|---|---|---|
| $SiO_2$ | 62.30 | 62.61 | 62.39 | 62.18 | 70.26 | 60.00 |
| $Al_2O_3$ | 13.98 | 18.64 | 18.73 | 18.83 | 19.69 | 25.00 |
| CaO | 23.72 | 5.60 | 6.68 | 7.75 | 10.05 | 9.00 |
| MgO | 0.00 | 11.53 | 10.85 | 10.17 | 0.00 | 6.00 |
| $Na_2O$ | 0.00 | 1.63 | 1.35 | 1.08 | 0.00 | 0.00 |
| $TiO_2$ | 0.00 | 0.00 | 0.00 | 0.00 | 0.00 | 0.00 |
| $Fe_2O_3$ | 0.00 | 0.00 | 0.00 | 0.00 | 0.00 | 0.00 |
| Fluorine | 0.00 | 0.00 | 0.00 | 0.00 | 0.00 | 0.00 |
| Measured Viscosity (° F.) | 2373 | 2462 | 2472 | 2451 | na | 2544 |
| Measured Liquidus Temp (° F.) | 2233 | 2254 | 2268 | 2247 | 2621 | 0 |
| Measured ΔT (° F.) | 140 | 208 | 204 | 204 | na | 0 |
| Measured Strength (KPsi) | 547 | na | na | na | na | na |
| Measured Density (g/cc) | 2.575 | 2.552 | na | na | na | na |
| Measured Modulus (MPsi) | 11.49 | 11.89 | na | na | na | na |
| Softening Point (° F.) | na | na | na | na | na | na |
| CTE in/in/(° F.) | na | na | na | na | na | na |

TABLE 2-H

| Glass | Ex. 43 | Ex. 44 | Ex. 45 | Ex. 46 | Ex. 47 | Ex. 48 |
|---|---|---|---|---|---|---|
| $SiO_2$ | 62.30 | 64.29 | 66.28 | 68.27 | 70.26 | 64.36 |
| $Al_2O_3$ | 13.98 | 15.41 | 16.84 | 18.26 | 19.69 | 18.75 |
| CaO | 23.72 | 20.30 | 16.89 | 13.47 | 10.05 | 16.89 |
| MgO | 0.00 | 0.00 | 0.00 | 0.00 | 0.00 | 0.00 |
| $Na_2O$ | 0.00 | 0.00 | 0.00 | 0.00 | 0.00 | 0.00 |
| $TiO_2$ | 0.00 | 0.00 | 0.00 | 0.00 | 0.00 | 0.00 |
| $Fe_2O_3$ | 0.00 | 0.00 | 0.00 | 0.00 | 0.00 | 0.00 |
| Fluorine | 0.00 | 0.00 | 0.00 | 0.00 | 0.00 | 0.00 |
| Measured Viscosity (° F.) | 2367 | 2466 | 2615 | 2813 | na | na |
| Measured Liquidus Temp (° F.) | 2216 | 2256 | 2421 | 2507 | 2519 | 2506 |
| Measured ΔT (° F.) | 151 | 210 | 194 | 306 | na | na |
| Measured Strength (KPsi) | na | na | na | na | na | na |
| Measured Density (g/cc) | na | na | na | na | na | na |
| Measured Modulus (MPsi) | na | na | na | na | na | na |
| Softening Point (° F.) | na | na | na | na | na | na |
| CTE in/in/(° F.) | na | na | na | na | na | na |

TABLE 2-I

| Glass | Ex. 49 | Ex. 50 | Ex. 51 | Ex. 52 | Ex. 53 | Ex. 54 |
|---|---|---|---|---|---|---|
| $SiO_2$ | 61.33 | 60.85 | 63.78 | 61.38 | 63.10 | 65.35 |
| $Al_2O_3$ | 23.40 | 22.90 | 17.24 | 18.32 | 20.00 | 19.25 |
| CaO | 0.15 | 3.15 | 8.12 | 9.67 | 4.90 | 4.15 |
| MgO | 15.03 | 13.00 | 10.08 | 9.65 | 11.30 | 10.55 |
| $Na_2O$ | 0.03 | 0.03 | 0.70 | 0.90 | 0.70 | 0.70 |
| $TiO_2$ | 0.01 | 0.01 | 0.01 | 0.01 | 0.00 | 0.00 |
| $Fe_2O_3$ | 0.05 | 0.05 | 0.05 | 0.05 | 0.05 | 0.05 |
| Fluorine | 0.00 | 0.00 | 0.00 | 0.00 | 0.00 | 0.00 |
| Measured Viscosity (° F.) | na | 2476 | na | na | 2531 | 2602 |
| Measured Liquidus Temp (° F.) | na | 2547 | na | na | 2498 | 2450 |
| Measured ΔT (° F.) | na | −71 | na | na | 33 | 152 |
| Measured Strength (KPsi) | na | na | na | na | 676 | na |
| Measured Density (g/cc) | na | 2.561 | na | na | 2.537 | na |
| Measured Modulus (MPsi) | na | 13.30 | na | na | 12.75 | na |
| Softening Point (° F.) | na | na | na | na | na | na |
| CTE in/in/(° F.) | na | na | na | na | na | na |

TABLE 2-J

| Glass | Ex. 55 | Ex. 56 | Ex. 57 | Ex. 58 | Ex. 59 | Ex. 60 |
|---|---|---|---|---|---|---|
| $SiO_2$ | 62.35 | 62.35 | 62.35 | 63.85 | 63.85 | 63.85 |
| $Al_2O_3$ | 22.25 | 19.25 | 19.25 | 20.75 | 19.25 | 19.25 |
| CaO | 4.15 | 7.15 | 4.15 | 4.15 | 5.65 | 4.15 |
| MgO | 10.55 | 10.55 | 13.55 | 10.55 | 10.55 | 12.05 |
| $Na_2O$ | 0.70 | 0.70 | 0.70 | 0.70 | 0.70 | 0.70 |
| $TiO_2$ | 0.00 | 0.00 | 0.00 | 0.00 | 0.00 | 0.00 |
| $Fe_2O_3$ | 0.00 | 0.00 | 0.00 | 0.00 | 0.00 | 0.00 |
| Fluorine | 0.00 | 0.00 | 0.00 | 0.00 | 0.00 | 0.00 |
| Measured Viscosity (° F.) | 2554 | 2504 | 2470 | 2680 | 2555 | 2531 |
| Measured Liquidus Temp (° F.) | 2527 | 2333 | 2385 | 2498 | 2431 | 2425 |
| Measured ΔT (° F.) | 27 | 171 | 85 | 182 | 124 | 106 |
| Measured Strength (KPsi) | 680 | 680 | na | na | 672 | 670 |
| Measured Density (g/cc) | na | 2.554 | 2.556 | na | 2.532 | 2.532 |
| Measured Modulus (MPsi) | na | 12.12 | na | na | 12.10 | 12.31 |
| Softening Point (° F.) | na | na | na | na | na | na |
| CTE in/in/(° F.) | na | na | na | na | na | na |

TABLE 2-K

| Glass | Ex. 61 | Ex. 62 | Ex. 63 | Ex. 64 | Ex. 65 | Ex. 66 |
|---|---|---|---|---|---|---|
| $SiO_2$ | 62.35 | 62.35 | 62.35 | 64.23 | 62.73 | 62.73 |
| $Al_2O_3$ | 20.75 | 20.75 | 19.25 | 19.63 | 21.13 | 19.63 |
| CaO | 5.65 | 4.15 | 5.65 | 4.53 | 4.53 | 6.03 |
| MgO | 10.55 | 12.05 | 12.05 | 10.93 | 10.93 | 10.93 |
| $Na_2O$ | 0.70 | 0.70 | 0.70 | 0.70 | 0.70 | 0.70 |
| $TiO_2$ | 0.00 | 0.00 | 0.00 | 0.00 | 0.00 | 0.00 |
| $Fe_2O_3$ | 0.00 | 0.00 | 0.00 | 0.00 | 0.00 | 0.00 |
| Fluorine | 0.00 | 0.00 | 0.00 | 0.00 | 0.00 | 0.00 |
| Measured Viscosity (° F.) | 2534 | 2516 | 2498 | 2560 | 2547 | 2514 |

TABLE 2-K-continued

| Glass | Ex. 61 | Ex. 62 | Ex. 63 | Ex. 64 | Ex. 65 | Ex. 66 |
|---|---|---|---|---|---|---|
| Measured Liquidus Temp (° F.) | 2441 | 2444 | 2400 | 2443 | 2482 | 2385 |
| Measured ΔT (° F.) | 93 | 72 | 98 | 117 | 65 | 129 |
| Measured Strength (KPsi) | na | na | na | na | na | 670 |
| Measured Density (g/cc) | na | 2.545 | 2.556 | na | na | 2.546 |
| Measured Modulus (MPsi) | na | na | na | na | na | 12.21 |
| Softening Point (° F.) | na | na | na | na | na | na |
| CTE in/in/(° F.) | na | na | na | na | na | na |

TABLE 2-L

| Glass | Ex. 67 | Ex. 68 | Ex. 69 | Ex. 70 | Ex. 71 | Ex. 72 |
|---|---|---|---|---|---|---|
| SiO₂ | 62.73 | 62.10 | 63.10 | 63.10 | 63.10 | 62.85 |
| Al₂O₃ | 19.63 | 20.00 | 19.00 | 20.00 | 20.00 | 19.75 |
| CaO | 4.53 | 4.90 | 4.90 | 3.90 | 4.90 | 4.65 |
| MgO | 12.43 | 11.30 | 11.30 | 11.30 | 10.30 | 11.05 |
| Na₂O | 0.70 | 0.70 | 0.70 | 0.70 | 0.70 | 0.70 |
| TiO₂ | 0.00 | 0.00 | 0.00 | 0.00 | 0.00 | 0.00 |
| Fe₂O₃ | 0.00 | 0.00 | 0.00 | 0.00 | 0.00 | 0.00 |
| Fluorine | 0.00 | 1.00 | 1.00 | 1.00 | 1.00 | 1.00 |
| Measured Viscosity (° F.) | 2504 | 2492 | 2508 | 2522 | 2531 | 2509 |
| Measured Liquidus Temp (° F.) | 2369 | 2433 | 2352 | 2470 | 2406 | 2425 |
| Measured ΔT (° F.) | 135 | 59 | 156 | 52 | 125 | 84 |
| Measured Strength (KPsi) | 676 | na | na | na | na | na |

TABLE 2-L-continued

| Glass | Ex. 67 | Ex. 68 | Ex. 69 | Ex. 70 | Ex. 71 | Ex. 72 |
|---|---|---|---|---|---|---|
| Measured Density (g/cc) | 2.547 | na | na | na | na | na |
| Measured Modulus (MPsi) | 12.42 | na | na | na | na | na |
| Softening Point (° F.) | na | na | na | na | na | na |
| CTE in/in/(° F.) | na | na | na | na | na | na |

TABLE 2-M

| Glass | Ex. 73 | Ex. 74 | Ex. 75 | Ex. 76 | Ex. 77 | Ex. 78 |
|---|---|---|---|---|---|---|
| SiO₂ | 62.56 | 63.55 | 62.56 | 60.57 | 60.57 | 61.00 |
| Al₂O₃ | 17.87 | 18.87 | 18.87 | 18.87 | 19.86 | 19.00 |
| CaO | 8.94 | 6.95 | 6.95 | 7.94 | 8.94 | 8.00 |
| MgO | 9.93 | 9.93 | 10.92 | 11.92 | 9.93 | 12.00 |
| Na₂O | 0.70 | 0.70 | 0.70 | 0.70 | 0.70 | 0.00 |
| TiO₂ | 0.00 | 0.00 | 0.00 | 0.00 | 0.00 | 0.00 |
| Fe₂O₃ | 0.00 | 0.00 | 0.00 | 0.00 | 0.00 | 0.00 |
| Fluorine | 0.00 | 0.00 | 0.00 | 0.00 | 0.00 | 0.00 |
| Measured Viscosity (° F.) | 2504 | 2563 | 2506 | 2430 | 2472 | 2448 |
| Measured Liquidus Temp (° F.) | 2273 | 2353 | 2330 | 2306 | 2343 | 2358 |
| Measured ΔT (° F.) | 231 | 210 | 176 | 124 | 129 | 90 |
| Measured Strength (KPsi) | na | na | na | na | na | na |
| Measured Density (g/cc) | 2.553 | 2.532 | 2.550 | 2.583 | 2.573 | 2.582 |
| Measured Modulus (MPsi) | 12.44 | 12.29 | 12.70 | 12.84 | 12.64 | 12.84 |
| Softening Point (° F.) | na | na | na | na | na | na |
| CTE in/in/(° F.) | na | na | na | na | na | na |

TABLE 2-N

| Glass | Ex. 79 | Ex. 80 | Ex. 81 | Ex. 82 | Ex. 83 | Ex. 84 |
|---|---|---|---|---|---|---|
| SiO₂ | 62.16 | 62.12 | 62.07 | 63.00 | 63.12 | 64.32 |
| Al₂O₃ | 19.12 | 19.22 | 19.23 | 18.00 | 18.84 | 18.54 |
| CaO | 8.03 | 7.94 | 8.01 | 9.00 | 4.82 | 4.52 |
| MgO | 9.69 | 9.64 | 9.76 | 10.00 | 12.52 | 12.22 |
| Na₂O | 1.00 | 0.97 | 0.99 | 0.00 | 0.70 | 0.40 |
| TiO₂ | 0.00 | 0.02 | 0.01 | 0.00 | 0.00 | 0.00 |
| Fe₂O₃ | 0.00 | 0.05 | 0.04 | 0.00 | 0.00 | 0.00 |
| Fluorine | 0.00 | 0.00 | 0.00 | 0.00 | 0.00 | 0.00 |
| Measured Viscosity (° F.) | 2512.75 | 2491 | na | 2518 | 2490 | 2534 |
| Measured Liquidus Temp (° F.) | 2268 | na | na | 2322 | 2442 | 2428 |
| Measured ΔT (° F.) | 244.75 | na | na | 196 | 48 | 106 |
| Measured Strength (KPsi) | na | 664 | na | na | na | na |
| Measured Density (g/cc) | 2.549 | na | na | 2.560 | 2.546 | 2.533 |
| Measured Modulus (MPsi) | na | 12.62 | na | 12.64 | 12.77 | na |
| Softening Point (° F.) | na | 960 | na | na | na | na |
| CTE in/in/(° F.) | 2.32 | na | na | na | na | na |

TABLE 2-O

| Glass | Ex. 85 | Ex. 86 | Ex. 87 | Ex. 88 | Ex. 89 | Ex. 90 |
|---|---|---|---|---|---|---|
| $SiO_2$ | 62.82 | 62.82 | 62.82 | 62.82 | 62.16 | 62.96 |
| $Al_2O_3$ | 20.04 | 18.54 | 18.54 | 18.54 | 19.12 | 18.92 |
| CaO | 4.52 | 6.02 | 4.52 | 4.52 | 8.03 | 7.83 |
| MgO | 12.22 | 12.22 | 13.72 | 12.22 | 9.69 | 9.49 |
| $Na_2O$ | 0.40 | 0.40 | 0.40 | 1.90 | 1.00 | 0.80 |
| $TiO_2$ | 0.00 | 0.00 | 0.00 | 0.00 | 0.00 | 0.00 |
| $Fe_2O_3$ | 0.00 | 0.00 | 0.00 | 0.00 | 0.00 | 0.00 |
| Fluorine | 0.00 | 0.00 | 0.00 | 0.00 | 0.00 | 0.00 |
| Measured Viscosity (° F.) | 2534 | 2506 | 2489 | 2492 | 2514 | 2532 |
| Measured Liquidus Temp (° F.) | 2478 | 2363.5 | 2446 | 2364.5 | 2262 | 2285 |
| Measured ΔT (° F.) | 56 | 142.5 | 43 | 127.5 | 252 | 247 |
| Measured Strength (KPsi) | na | na | na | na | na | na |
| Measured Density (g/cc) | 2.548 | 2.555 | 2.557 | 2.538 | 2.556 | 2.552 |
| Measured Modulus (MPsi) | na | na | na | na | 12.62 | na |
| Softening Point (° F.) | na | na | na | na | na | na |
| CTE in/in/(° F.) | na | na | na | na | na | na |

TABLE 2-P

| Glass | Ex. 91 | Ex. 92 | Ex. 93 | Ex. 94 |
|---|---|---|---|---|
| $SiO_2$ | 61.96 | 61.96 | 61.96 | 61.96 |
| $Al_2O_3$ | 19.92 | 18.92 | 18.92 | 18.92 |
| CaO | 7.83 | 8.83 | 7.83 | 7.83 |
| MgO | 9.49 | 9.49 | 10.49 | 9.49 |
| $Na_2O$ | 0.80 | 0.80 | 0.80 | 1.80 |
| $TiO_2$ | 0.00 | 0.00 | 0.00 | 0.00 |
| $Fe_2O_3$ | 0.00 | 0.00 | 0.00 | 0.00 |
| Fluorine | 0.00 | 0.00 | 0.00 | 0.00 |
| Measured Viscosity (° F.) | 2524 | 2489 | 2488 | 2504 |
| Measured Liquidus Temp (° F.) | 2337 | 2274.5 | 2333 | 2267.5 |
| Measured ΔT (° F.) | 187 | 214.5 | 155 | 236.5 |
| Measured Strength (KPsi) | na | na | na | na |
| Measured Density (g/cc) | 2.561 | 2.568 | 2.567 | 2.557 |
| Measured Modulus (MPsi) | na | na | na | na |
| Softening Point (° F.) | na | na | na | na |
| CTE in/in/(° F.) | na | na | na | na |

As is understood in the art, the above exemplary inventive compositions do not always total 100% of the listed components due to statistical conventions (such as, rounding and averaging) and the fact that some compositions may include impurities that are not listed. Of course, the actual amounts of all components, including any impurities, in a composition always total 100%. Furthermore, it should be understood that where small quantities of components are specified in the compositions, for example, quantities on the order of about 0.05 weight percent or less, those components may be present in the form of trace impurities present in the raw materials, rather than intentionally added.

Additionally, components may be added to the batch composition, for example, to facilitate processing, that are later eliminated, thereby forming a glass composition that is essentially free of such components. Thus, for instance, minute quantities of components such as fluorine and sulfate may be present as trace impurities in the raw materials providing the silica, calcia, alumina, and magnesia components in commercial practice of the invention or they may be processing aids that are essentially removed during manufacture.

As apparent from the above examples, glass fiber compositions of the invention have advantageous properties, such as low fiberizing temperatures and wide differences between the liquidus temperatures and the fiberizing temperatures (high ΔT values). Other advantages and obvious modifications of the invention will be apparent to the artisan from the above description and further through practice of the invention). The high-performance glass of the present invention melts and refines at relatively low temperatures, has a workable viscosity over a wide range of relatively low temperatures, and a low liquidus temperature range.

Example 2

Corrosion Resistance of Glass Fibers Formed from the Inventive Composition in 10% $HNO_3$ Samples from rovings of glass fibers formed in accordance with the inventive composition and a sample from a roving of boron-free fibers were desized by heating the fibers in a furnace at 625° C. for 30 minutes. The bare fibers were then permitted to cool in a dessicator. Once the fibers were cool, the samples were taken from the dessicator and each of the bare fiber samples were weighed ($W_1$) and recorded. A sample of basalt was also obtained, weighed ($W_1$), and recorded. The samples (i.e., inventive bare fibers, boron-free bare fibers, and basalt) were individually placed in flasks to which 150 ml of 10% $HNO_3$ was added. The flasks were placed in a bath at 96° C. for 24 hours, 100 hours, and 240 hours. At the end of their respective time period, the samples of inventive fibers, boron-free fibers, and basalt were removed from the flasks and filtered through filter paper. The paper filters were placed in cleaned crucibles and heated in a furnace at 625° C. for 30 minutes. The samples were then placed in a dessicator to cool. After the samples were cool, the final weight ($W_2$) of each of the samples was recorded. The percent weight loss of the fibers and basalt was calculated using the formula $100 \cdot ((W_1 - W_2)/W_1)$.

The results of the percent weight loss of the glass fibers formed from the inventive composition compared to the percent weight loss of the boron-free fibers and basalt are graphically illustrated in FIG. 1. Percent weight loss is a measure of the corrosion resistance of a particular substance, such as glass fibers. In particular, the lower the percent weight loss for a glass fiber in a corrosive substance, the higher the corrosion resistance for that glass fiber. As shown in FIG. 1, fibers formed from the inventive composition had a percent weight loss that was equal to or better than the boron-free fibers. Thus, the inventive glass fibers demonstrated a corrosion resistance in nitric acid that was equal to or better than the boron-free fibers. It can be concluded that the glass fibers formed from the inventive composition would form commercially acceptable products with respect to corrosion resistance compared to current products formed from boron-free glass fibers. It is also clearly shown in FIG. 1 that the inventive fibers had a lower percent weight loss than the basalt and therefore had superior corrosion resistance compared to the basalt.

Example 3

Corrosion Resistance of Glass Fibers Formed from the Inventive Composition in 5% $H_2SO_4$ Samples from rovings of glass fibers formed in accordance with the inventive composition, a sample from a roving of boron-free fibers, a sample from a roving of E-glass fibers, and a sample from a roving of E-CR glass were desized by heating the fibers in a furnace at 625° C. for 30 minutes. The bare fibers were then permitted to cool in a dessicator. Once the fibers were cool, the samples were taken from the dessicators and each of the bare fiber samples were weighed ($W_1$) and recorded. A sample of basalt was also obtained, weighed ($W_1$), and recorded. The samples (i.e., inventive bare fibers, boron-free bare fibers, E-glass bare fibers, E-CR bare fibers, and basalt) were individually placed in flasks and 150 ml of 5% $H_2SO_4$ was added. The flasks were then placed in a bath at 96° C. for 24 hours, 100 hours, and 240 hours. At the end of their respective time period, the samples of inventive fibers, boron-free fibers, E-glass fibers, E-CR glass fibers, and basalt were removed from the flasks and filtered through filter paper. The paper filters were placed in cleaned crucibles and heated in a furnace at 625° C. for 30 minutes. The samples were then placed in a dessicator to cool. After the samples were cooled, the weight ($W_2$) of each of the samples was recorded. The percent weight loss of the fibers and basalt was calculated using the formula $100 \cdot ((W_1 - W_2)/W_1)$.

Figure 2:
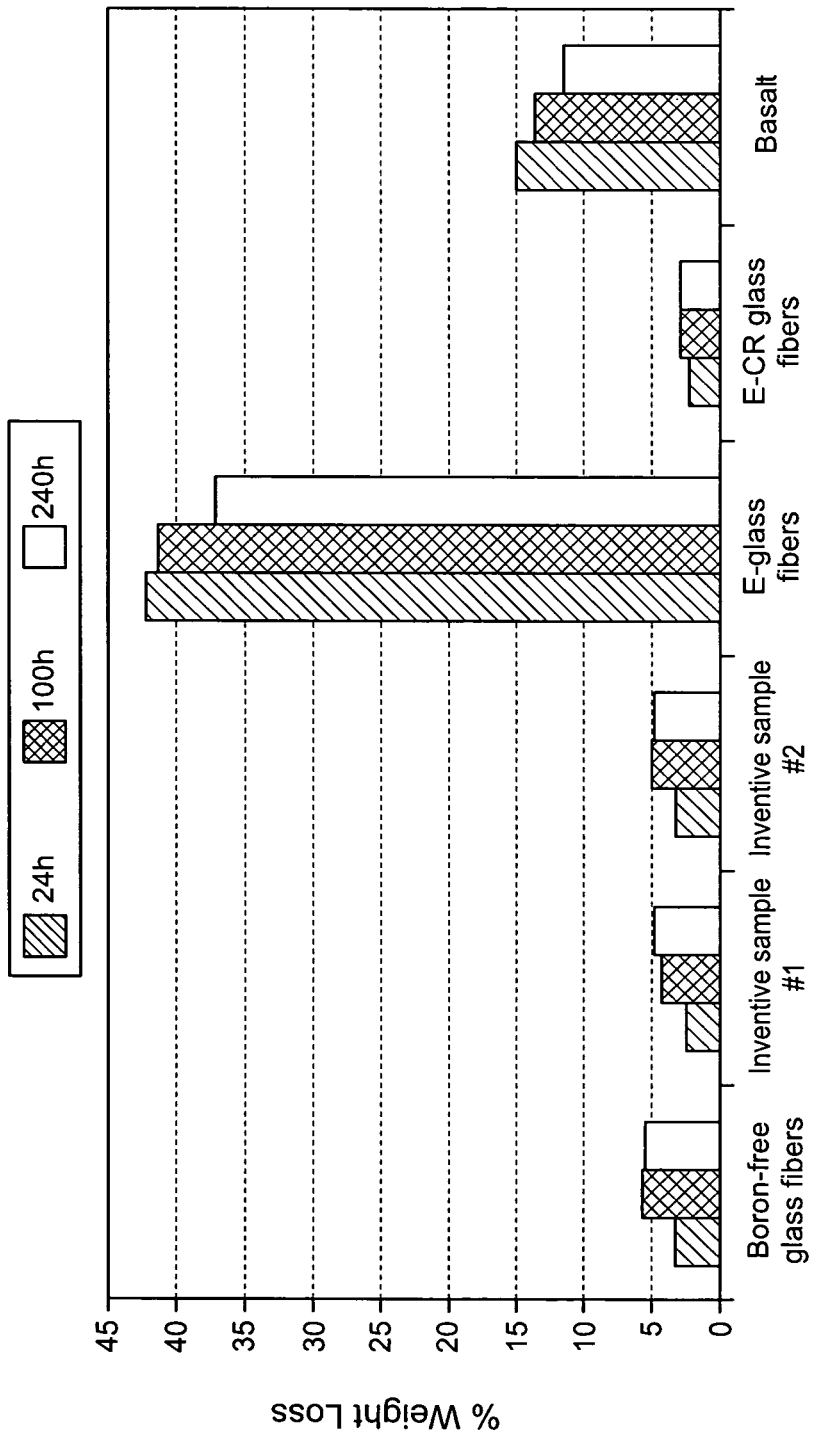
FIG. 2 is a graphical illustration of the percentage of weight loss of glass fibers and basalt after immersion in 5% sulfuric acid at 96° C. for 24 hours, 100 hours, and 240 hours.

The percentage of weight loss of the glass fibers and basalt is illustrated in FIG. 2. As discussed above with respect to Example 2, a glass fiber's resistance to corrosion is reflected by the percentage of weight lost. In other words, the more weight that is lost from the glass fibers over time while in the acidic solution, the less the fiber is resistant to corrosion. As depicted in FIG. 2, the inventive glass fibers demonstrated a corrosion resistance in sulfuric acid that was equal to or better than boron-free glass fibers and E-CR glass fibers. It can be concluded that the glass fibers formed from the inventive composition would form commercially acceptable products with respect to corrosion resistance compared to current products formed from boron-free glass fibers and E-CR glass fibers. In addition, fibers formed from the inventive composition were clearly superior in their resistance to corrosion compared to E-glass fibers. This superior corrosion resistance of the inventive glass fibers over E-glass fibers would enable products formed from fibers made with the inventive composition to have a longer life span.

Example 4

Corrosion Resistance of Glass Fibers Formed from the Inventive Composition in $H_2O$ Samples from rovings of glass fibers formed in accordance with the inventive composition and a sample from a roving of boron-free fibers were desized by heating in a furnace at 625° C. for 30 minutes. The bare fibers were then permitted to cool in a dessicator. Once the fibers were cool, the samples were taken from the dessicator and each of the bare fiber samples were weighed ($W_1$) and recorded. A sample of basalt was also obtained, weighed ($W_1$), and recorded. The samples (i.e., inventive bare fibers, boron-free bare fibers, and basalt) were individually placed in flasks to which 150 ml of $H_2O$ was added. The flasks were then placed in a bath at 96° C. for 24 hours, 100 hours, and 240 hours. At the end of their respective time period, the samples of inventive fibers, boron-free fibers, and basalt were removed from the flasks and filtered through filter paper. The paper filters were placed in cleaned crucibles and heated in a furnace at 625° C. for 30 minutes. The samples were then placed in a dessicator to cool. After the samples were cooled, the weight ($W_2$) of each of the samples was recorded. The percent weight loss was calculated using the formula $100 \cdot ((W_1 - W_2)/W_1)$.

Figure 3:
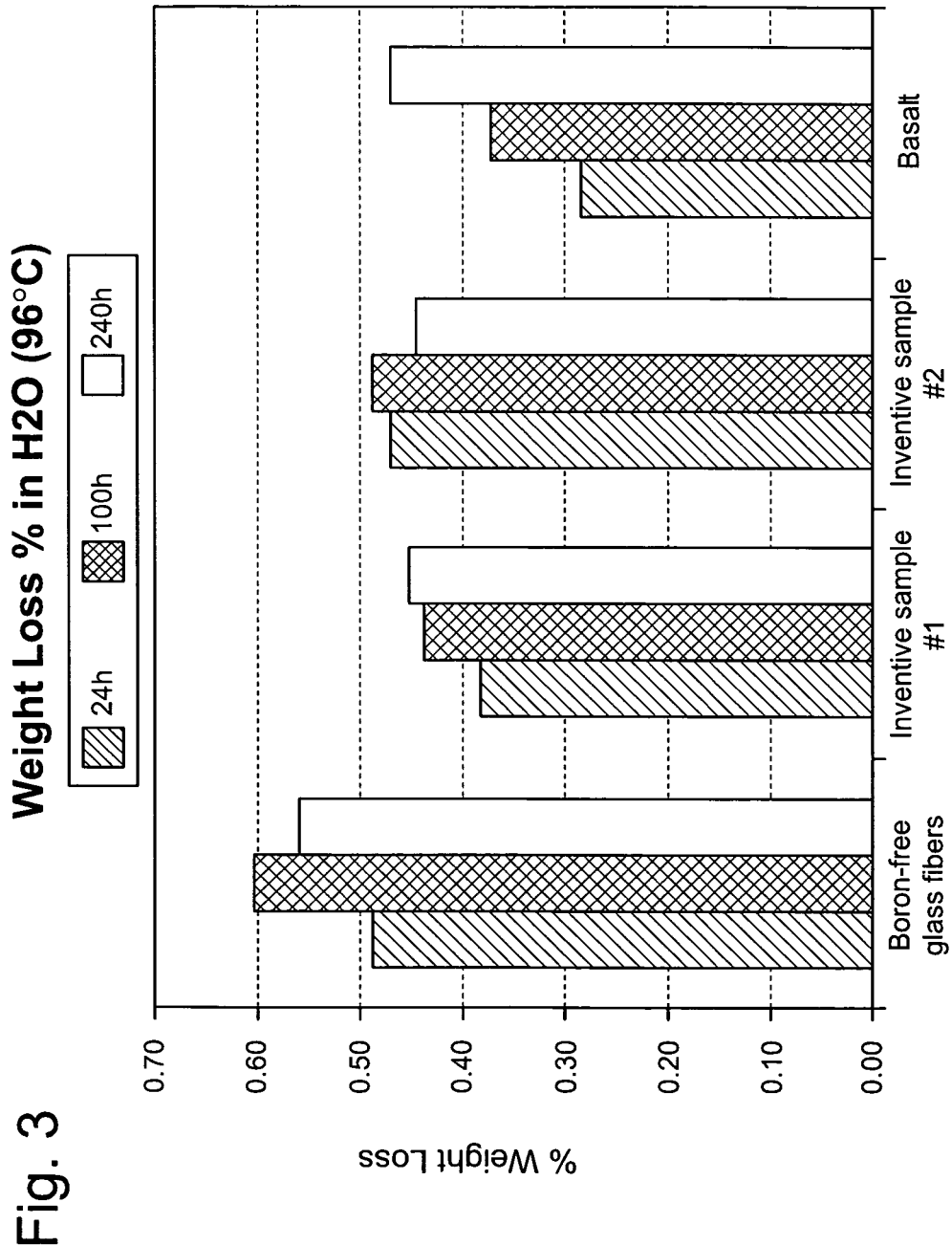
FIG. 3 is a graphical illustration of the percentage of weight loss of glass fibers and basalt after immersion in water at 96° C. for 24 hours, 100 hours, and 240 hours.

The results of the percent weight loss of the glass fibers formed from the inventive composition compared to the weight loss of the boron-free fibers and basalt are graphically illustrated in FIG. 3. As depicted in FIG. 3, the inventive composition demonstrated less weight loss than the boron-free fibers. Thus, the inventive fibers had an improved corrosion resistance in water compared to the boron-free fibers. In addition, the inventive glass fibers demonstrated a corrosion resistance in water that was equal to or better than the basalt.

Example 5

Corrosion Resistance of Inventive Glass Fibers Compared to Boron-Free Glass Fibers in Various Corrosive Media Glass fibers were made by conventional glass forming techniques utilizing the inventive composition. In particular, molten glass containing the components of the inventive composition in the desired amounts is pulled or attenuated through holes or orifices in the bottom of a bushing to form individual glass filaments. The average filament diameter was determined to be 17 μm and the bundle tex was 1200 tex. Strands of glass fibers were formed by gathering the individual filaments together.

Five samples composed of approximately 30 yards of the inventive fiber strands were used for testing. In addition, five samples of approximately 30 yards of boron-free fiber strands (average filament diameter 17 μm with a bundle tex of 1200 tex) were obtained. One 30 yard sample of the inventive fiber strands and one 30 yard sample of the boron-free fiber strands were heated in accordance with the parameters set forth in ASTM D2584 to determine the percent of sizing on the glass fibers.

The remaining eight samples were placed in eight individual glass jars. Two jars (one with an inventive glass fiber strand sample and one with a boron-free glass strand sample) were filled with deionized water. Two jars (one with an inventive glass fiber strand sample, one with a boron-free glass strand sample) were filled with 5% salt water. Two jars (one with an inventive glass fiber strand sample and one with a boron-free glass strand sample) were filled with 1N sulfuric acid. Two jars (one with an inventive glass fiber strand sample and one with a boron-free glass strand sample) were filled with 1N nitric acid. Lids were placed on each of the jars and the jars were stored at 25° C. for 500 hours.

After 500 hours had elapsed, all eight samples were triple rinsed with 150° F. (65.5° C.) deionized water, dried, and weighed. The weight of each of the samples was recorded. The samples were then heated in accordance with ASTM D2584 to burn off any remaining sizing. The percent weight loss of the fibers was calculated using the formula $100 \cdot (W_1 - W_2/W_1)$, where $W_1$ was the initial weight of the sample and $W_2$ was the weight after treatment with the corrosive substance. The final percent glass loss was determined by subtracting the size LOI from the percent weight loss determined from the final weight burn-off. The results of the experiment are set forth in Table 3.

TABLE 3

| | Glass Type | Initial Weight | Weight After Five hours @ 250 °F. | % Weight Loss | Final Weight Burn-Off | % Weight Loss | Number of Hours | Size LOI | % Glass Loss |
|---|---|---|---|---|---|---|---|---|---|
| Deionized water | Boron-Free | 32.3055 | 32.195 | 0.34 | 32.079 | 0.70 | 504 | 0.61 | 0.09 |
| Deionized water | Inventive | 32.3297 | 32.235 | 0.29 | 32.137 | 0.60 | 504 | 0.57 | 0.03 |
| 5% Saltwater | Boron-Free | 32.3280 | 32.257 | 0.22 | 32.108 | 0.68 | 504 | 0.61 | 0.07 |
| 5% Saltwater | Inventive | 32.4303 | 32.381 | 0.15 | 32.237 | 0.60 | 504 | 0.57 | 0.03 |
| 5% Sulfuric Acid | Boron-Free | 32.2758 | 32.114 | 0.50 | 32.014 | 0.81 | 504 | 0.61 | 0.20 |
| 5% Sulfuric Acid | Inventive | 32.3811 | 32.262 | 0.37 | 32.161 | 0.68 | 504 | 0.57 | 0.11 |
| 1N Nitric Acid | Boron-Free | 32.2955 | 32.150 | 0.45 | 32.041 | 0.79 | 504 | 0.61 | 0.18 |
| 1N Nitric Acid | Inventive | 32.4569 | 32.346 | 0.34 | 32.236 | 0.68 | 504 | 0.57 | 0.11 |

As shown in Table 3, the inventive fibers had glass loss percents that were significantly less than the percent of glass lost the boron-free glass fibers. The amount of glass that is eroded by the corrosive substance is another method of determining a fiber's resistance to corrosion. For example, the more glass that is eroded by the corrosive substance during a particular time period, the less the fiber is resistant to corrosion. From the results set forth in Table 3, it can be concluded that the fibers formed from the inventive composition had superior corrosion resistance compared to boron-free fibers. It can also be concluded that the inventive glass fibers would form commercial products that have corrosive properties at least equal to, and even superior to, current products formed from boron-free glass fibers.

Example 6

Three Point Bending Strength Retention Test

Laminates formed from E-glass fibers, boron-free fibers, and inventive fibers were formed by dry winding the glass fibers and utilizing a conventional vacuum-assisted resin infusion process. The laminates thus formed were cured for 24 hours at 35° C., followed by a post-cure for 4 hours at 90° C. Samples having a thickness of 2.09 mm and a width of 13.44 mm were obtained. Samples of the laminates from the E-glass fibers, boron-free fibers, and inventive fibers were tested for their bending strength retention prior to aging. The results were recorded. Samples from each of the laminates were immersed in 5% $H_2SO_4$ under constant strain at room temperature for one month. In particular, the samples were tested with a four point bending test at two imposed strain levels (1.03% strain (load 1) and a 1.40% strain (load 2)) for one month. It was observed that the E-glass laminate samples broke after 48 hours. After one month, neither the boron-free laminate samples nor the inventive fiber laminate samples were broken.

Figure 4:
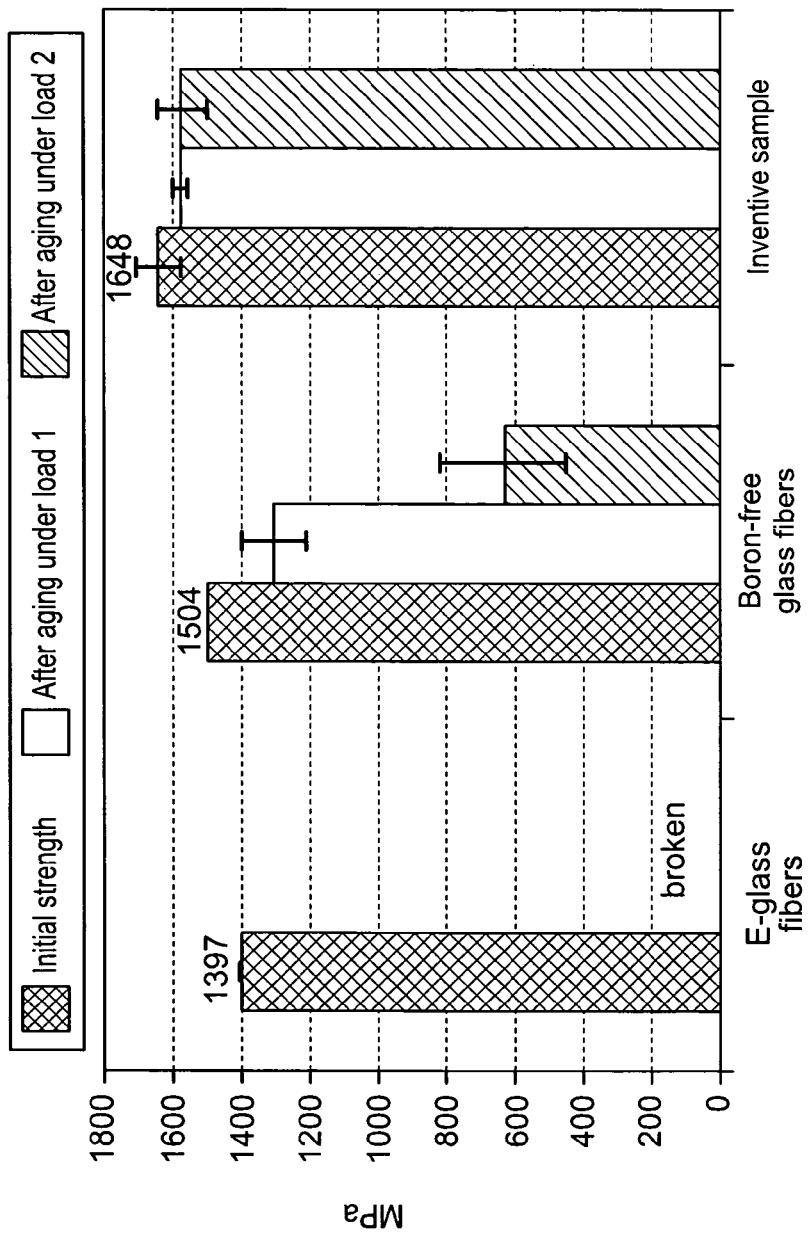
FIG. 4 is a graphical illustration of the 3-point bending strength retention of glass fibers after one month strain corrosion in 5% sulfuric acid.

To evaluate the bending strength retention, a three point bending test was utilized. In this test, the aged samples were placed on a testing apparatus in which the sample is horizontally stabilized by two supports separated a distance from each other and a force is applied vertically (i.e., downwardly) to the center of the samples. The force is applied until the sample breaks. The results of the three-point bending test are illustrated in FIG. 4. It can be seen that the inventive fiber laminate samples have a higher initial strength and higher strengths after aging compared to both the boron-free glass laminate samples and the E-glass laminate samples. Thus, it can be concluded that fibers formed from the inventive composition possess superior strength compared to both E-glass fibers and boron-free fibers, thus enabling a longer life span of composite products formed from fibers made with the inventive composition.

Example 6

ISO Classification of Inventive Fibers

Inventive fibers, boron-free fibers, and E-glass fibers were tested for resistance to hydrolysis according to the standards set forth in ISO 720. Hydrolysis is one form of corrosion. According to ISO 720, utilizing HCl at 0.02N, classification HGA 1 is 0.10 ml, HGA 2 is 0.85 ml, and HGA 3 is 1.50 ml. The results are set forth in Table 4.

TABLE 4

| | Example 1 (ml 0.02 N HCl) | Example 2 (ml 0.02 N HCl) | Average (ml 0.02 N HCl) | ISO 720 Classification |
|---|---|---|---|---|
| Inventive Glass Fibers | 0.08 | 0.08 | 0.08 | HGA 1 |
| Boron-Free Glass Fibers | 0.14 | 0.14 | 0.14 | HGA 2 |
| E-Glass fibers | 0.14 | 0.14 | 0.14 | HGA 2 |

As shown in Table 4, based on the average weight loss, the inventive glass fibers were placed in the classification HGA 1, whereas the boron-free fibers and the E-glass fibers were classified as HGA 2. A classification of HGA 1 indicates a better resistance to hydrolysis (i.e., corrosion) than a classification of HGA 2. Thus, composite products formed from the inventive glass fibers would be expected to have a better hydrolysis resistance than products formed from boron-free glass fibers or E-glass fibers.

The invention of this application has been described above both generically and with regard to specific embodiments. Although the invention has been set forth in what is believed to be the preferred embodiments, a wide variety of alternatives known to those of skill in the art can be selected within the generic disclosure. Other advantages and obvious modifications of the invention will be apparent to the artisan from the above description and further through practice of the invention. The invention is not otherwise limited, except for the recitation of the claims set forth below.

Having thus described the invention, what is claimed is:

1. A high performance glass fiber produced from a composition comprising:
   $SiO_2$ in an amount from about 60.5 to about 70.5 weight percent of the total composition;
   $Al_2O_3$ in an amount from about 10 to about 24.5 weight percent of the total composition;
   RO in an amount from about 10 to about 24.0 weight percent of the total composition, said RO being the sum of MgO, SrO, CaO, and BaO, wherein the amount of CaO present in said RO comprises at least 4 weight percent of the total composition and the amount of MgO comprises at least 5 weight percent of the total composition;
   less than 1 weight percent $TiO_2$; and
   alkali metal oxides in an amount from about 0 to about 3 weight percent of the total composition,
   wherein said glass fiber is resistant to corrosion and said composition has a $\Delta T$ of at least about 80° F.

2. The high performance fiber of claim 1, further comprising:
   less than 4 weight percent of the total composition of at least one compound selected from the group consisting of ZnO, $SO_3$, Fluorine, $B_2O_3$ and $Fe_2O_3$.

3. The high performance fiber of claim 1, wherein said glass has a fiberizing temperature less than about 2650° F. and a $\Delta T$ for the glass is at least about 120° F.

4. The high performance fiber of claim 1, wherein said glass has a strength greater than about 600 KPsi.

5. The high performance glass fiber of claim 1, wherein said glass fiber has a modulus greater than about 12.0 MPsi.

6. The high performance glass fiber of claim 1, wherein said glass fiber has a coefficient of thermal expansion (CTE) between about $2.28 \times 10^{-6}$ in/in/° F. and about $2.77 \times 10^6$ in/in/° F.

7. The high performance glass fiber of claim 1, wherein said glass fiber has a resistance to corrosion that is at least equal to a corrosion resistance of boron-free glass fibers and E-glass fibers.

8. The high performance glass fiber of claim 1, wherein said glass fiber has a classification of HGA 1 according to the standards set forth in ISO 720.

9. A fiberglass reinforced article comprising:
   glass fibers formed from a composition including:
   $SiO_2$ in an amount from about 60.5 to about 70.5 weight percent of the total composition;
   $Al_2O_3$ in an amount from about 10 to about 24.5 weight percent of the total composition;
   RO in an amount from about 10 to about 24.0 weight percent of the total composition, said RO being the sum of MgO, SrO, CaO, and BaO, wherein the amount of CaO comprises at least 4 weight percent of the total composition and the amount of MgO comprises at least 5 weight percent of the total composition;
   $Na_2O$ in an amount from about 0.25 to about 2 weight percent; and
   alkali metal oxides in an amount from about 0 to about 3 weight percent of the total composition, wherein said composition has a $\Delta T$ of at least about 80° F., and
   a curable matrix material, wherein said glass fibers are corrosion resistant.

10. The fiberglass reinforced article of claim 9, wherein said glass fibers further include less than 4 weight percent of the total composition of at least one compound selected from the group consisting of ZnO, $SO_3$, Fluorine, $B_2O_3$, $TiO_2$ and $Fe_2O_3$.

11. The fiberglass reinforced article of claim 9, wherein said glass fibers have a resistance to corrosion that is at least equal to a corrosion resistance of boron-free glass fibers and E-glass fibers.

12. The fiberglass reinforced article of claim 9, wherein said glass fibers have a classification of HGA 1 according to the standards set forth in ISO 720.

13. The fiberglass reinforced article of claim 9, wherein said glass fibers have a fiberizing temperature less than about 2650° F. and a $\Delta T$ for the glass is at least about 120° F.

14. The fiberglass reinforced article of claim 9, wherein said glass fibers have a strength greater than about 600 KPsi and a modulus greater than about 12.0 MPsi.

15. The fiberglass reinforced article of claim 9, wherein said glass fibers have a coefficient of thermal expansion (CTE) between about $2.28 \times 10^{-6}$ in/in/° F. and about $2.77 \times 10^{-6}$ in/in/° F.

16. A method of forming a high performance glass fiber comprising:
    providing a molten glass composition including:
    $SiO_2$ in an amount from about 60.5 to about 70.5 weight percent of the total composition;
    $Al_2O_3$ in an amount from about 10 to about 24.5 weight percent of the total composition;
    RO in an amount from about 10 to about 24.0 weight percent of the total composition, said RO being the sum of MgO, SrO, CaO, and BaO, wherein the amount of CaO comprises at least 4 weight percent of the total composition and the amount of MgO comprises at least 5 weight percent of the total composition;
    less than 1 weight percent $TiO_2$; and
    alkali metal oxides in an amount from about 0 to about 3 weight percent of the total composition; and
    drawing said molten glass composition through a bushing to form a high performance glass fiber, said high performance glass fiber having a resistance to corrosion.

17. The method of forming a high performance glass fiber according to claim 16, wherein said molten glass composition further include less than 4 weight percent of the total composition of at least one compound selected from the group consisting of ZnO, $SO_3$, Fluorine, $B_2O_3$, and $Fe_2O_3$.

18. The method of forming a high performance glass fiber according to claim 16, wherein said high performance glass fiber has a classification of HGA 1 according to the standards set forth in ISO 720.

19. The method of forming a high performance glass fiber according to claim 16, wherein said high performance glass fiber has a corrosion resistance that is at least equal to a corrosion resistance of boron-free glass fibers and E-glass fibers.

20. The method of forming a high performance glass fiber according to claim 16, wherein said reinforced article is a blade for a wind turbine.

* * * * *